US012645868B1

(12) United States Patent
Bender et al.

(10) Patent No.: US 12,645,868 B1
(45) Date of Patent: Jun. 2, 2026

(54) SCIENTIFIC MANUSCRIPT GENERATION USING LARGE LANGUAGE MODELS

(71) Applicant: Sorcero, Inc., Washington, DC (US)

(72) Inventors: Walter Bender, Newton, MA (US);
Alexandar Em Sterling, Dawlish (GB)

(73) Assignee: Sorcero, Inc., Washington, DC (US)

( * ) Notice: Subject to any disclaimer, the term of this patent is extended or adjusted under 35 U.S.C. 154(b) by 0 days.

(21) Appl. No.: 19/365,719

(22) Filed: Oct. 22, 2025

(51) Int. Cl.
| | |
|---|---|
| *G06F 40/169* | (2020.01) |
| *G06F 3/04842* | (2022.01) |
| *G06F 16/38* | (2019.01) |
| *G06F 40/106* | (2020.01) |

(52) U.S. Cl.
CPC ........ *G06F 40/169* (2020.01); *G06F 3/04842* (2013.01); *G06F 16/382* (2019.01); *G06F 40/106* (2020.01)

(58) Field of Classification Search
CPC .. G06F 40/169; G06F 3/04842; G06F 16/382; G06F 40/106
See application file for complete search history.

(56) References Cited

U.S. PATENT DOCUMENTS

| | | | | |
|---|---|---|---|---|
| 12,511,301 | B1 * | 12/2025 | Cetoli | ............... G06F 16/24578 |
| 2016/0232152 | A1 * | 8/2016 | Mahamood | ........... G06F 40/186 |
| 2024/0386185 | A1 * | 11/2024 | Munoz | .................. G06F 40/103 |
| 2025/0307530 | A1 * | 10/2025 | Ovbiagele | ............. G06F 40/166 |

OTHER PUBLICATIONS

Bandos et al., "Best practices and pragmatic approaches for patient-reported outcomes and quality of life measures in cancer clinical trials" JNCI Monographs, vol. 68, pp. 14-21, dated 2025 https://academic.oup.com/jncimono/article/2025/68/14/8030353.
Hanna et al., "Mortality due to cancer treatment delay: systematic review and meta-analysis", BMJ 2020;371:m4087, dated 2020, http://dx.doi.org/10.1136/bmj.m4087.
Harris et al., "Optimizing the Value of Regulatory Medical Writers." AMWA Journal, 26(3), 88-90. dated 2021, 7 pages, https://www.amwajournal.org/index.php/amwa/article/view/82.

(Continued)

*Primary Examiner* — Irete F Ehichioya
*Assistant Examiner* — Phoebe X Pan
(74) *Attorney, Agent, or Firm* — Foley & Lardner LLP

(57) ABSTRACT

Systems, methods, and computer-readable storage media for scientific manuscript generation using large language models are disclosed. A system can include one or more processors configured to receive an input including at least one machine-readable data object divided by one or more input node identifiers, generate a multi-level resource mapping encoding associations between the input node identifiers and one or more output node identifiers, construct a set of model input parameters based on a selection of resources from the machine-readable data object, provide each set of model input parameters to a first generative model to generate an output data object, generate at least one metric for each output data object based on a comparison to a structural or coverage parameter, automatically generate modified model input parameters to regenerate the output, and generate a function that creates an annotation linking each output to at least one input node identifier.

18 Claims, 10 Drawing Sheets

(56)     References Cited

OTHER PUBLICATIONS https://storm.genie.stanford.edu/.

International Society for Medical Publication Professionals (ISMPP) position statement and call to action on artificial intelligence. (2023). Current Medical Research and Opinion, 40(1), pp. 9-10. https://doi.org/10.1080/03007995.2023.2273139.

McMinn et al., "Using artificial intelligence to expedite and enhance plain language summary abstract writing of scientific content", JAMIA Open; 8(2):ooaf023, 12 pages, dated Apr. 3, 2025, https://doi.org/10.1093/jamiaopen/ooaf023.

Neal et al., "Is increased time to diagnosis and treatment in symptomatic cancer associated with poorer outcomes? Systematic review." British Journal of Cancer, 112(S1), pp. S92-S107. dated 2015, https://www.nature.com/articles/bjc201548.

Nguyen et al., "Human-AI collaboration patterns in AI-assisted academic writing. Educational Technology Research and Development. Published online ahead of print." Studies in Higher Education. (49):5, pp. 847-864, dated 2024.

Sallam et al. "ChatGPT Utility in Healthcare Education, Research, and Practice: Systematic Review on the Promising Perspectives and Valid Concerns", Healthcare 11(6), 887, 20 pages, dated 2023, https://www.mdpi.com/2227-9032/11/6/887.

Van Dis et al. "ChatGPT: five priorities for research." Nature, 614(7947), pp. 224-226, dated Feb. 9, 2023. https://www.nature.com/articles/d41586-023-00288-7.

* cited by examiner

SCIENTIFIC MANUSCRIPT GENERATION USING LARGE LANGUAGE MODELS

BACKGROUND

Source materials such as clinical study reports (CSRs), statistical analysis plans (SAPs), and other documentation can be transformed into structured scientific manuscripts or summaries for regulatory and publication purposes. However, human generation of such outputs can be slow and resource-intensive. While automated generation can reduce effort, such mechanisms are computationally costly, prone to latency, lack traceability, may fail to adhere to regulatory and industry standards, and may produce unsupported content when processing complex inputs. Therefore, it is challenging to map source materials into effective prompts for a large language model and to verify that generated outputs are scientifically accurate, traceable to the source, and comply with relevant standards.

SUMMARY

The present disclosure relates to one or more systems, methods, and computer-readable storage media (CRM) for scientific manuscript generation using large language models (LLMs). The data processing system described herein can ingest and process (e.g., label) source materials, identify a target journal for an output manuscript, define source to section mappings, generate prompts for the LLMs, generate output content based on the prompts, perform post-generation cleanup operations, receive and process subject matter expert (SME) feedback (e.g., related to scientific accuracy and rule adhere, content and completeness, presentation and polish, etc.), apply any additional validators or validation operations, and return output results to a customer. The systems, methods, and computer-readable storage media herein address technical challenges associated with structured output generation in scientific or other contexts by automatically generating source mappings to improve output accuracy, increase efficiency, and reduce LLM hallucinations (e.g., unsupported outputs, errors, etc.). Further, the systems, methods, and computer-readable storage media perform compliance checks based on established regulatory standards and guidelines, implement metrics-based quality controls, generate annotations with source validation on a section-by-section basis for output content, generate references with verifications, explanations, or justifications, facilitate journal targeting, and provide figure descriptions or alternatives, thereby improving the accuracy, reliability, and efficiency of scientific manuscript generation.

At least one aspect relates to a system. The system can include one or more processors coupled to memory. The one or more processors can be configured to receive an input including at least one machine-readable data object including resources divided by one or more input node identifiers. The one or more processors can be configured to generate a multi-level resource mapping encoding associations between the one or more input node identifiers and one or more output node identifiers. The one or more processors can be configured to construct, for each of the one or more output node identifiers, a set of model input parameters, each set of model input parameters based on a selection of at least a portion of the resources from the at least one machine-readable data object, the selection based on an association with one or more corresponding input node identifiers encoded by the multi-level resource mapping. The one or more processors can be configured to provide each set of model input parameters to a first generative model to generate an output data object for each of the one or more output node identifiers. The one or more processors can be configured to generate at least one metric for each output data object, the at least one metric based on a comparison of the output data object to a corresponding structural or coverage parameter. The one or more processors can be configured to, in response to the at least one metric failing to satisfy the corresponding structural or coverage parameter, automatically generate a modified set of model input parameters to regenerate the output data object; and generate, based on a schema of a word processing application, a function that causes the word processing application to create an annotation for each output data object by (i) identifying, using a second generative model, a textual or graphical representation presented in a first region of a graphical user interface of the word processing application for each output data object and (ii) populating a body of the annotation with an indicator linking each textual or graphical representation to at least one of the one or more input node identifiers, the annotation configured to be presented in a second region of the graphical user interface of the word processing application.

In some aspects, the one or more processors are further configured to associate the annotation with a portion of the output data object presented in the first region of the graphical user interface of the word processing application, and provide the annotation for presentation in the second region of the graphical user interface of the word processing application responsive at least in part to selection of the portion of the output data object.

In some aspects, each of the one or more input node identifiers corresponds with a location of the resources within the at least one machine-readable data object, and the indicator presents the location of the resources on the word processing application via the annotation.

In some aspects, the one or more processors are further configured to determine a structure and one or more fields of the function based on the schema of the word processing application, populate, based on the structure, the one or more fields of the function with metadata, the metadata including at least the indicator and a source identifier associated with the second generative model, and execute, via an application programming interface (API) of the word processing application, the function to cause the word processing application to create the annotation attributed to the source identifier.

In some aspects, the one or more processors are further configured to generate a target object by aggregating the textual or graphical representation for each output data object based on the multi-level resource mapping and at least one set of (i) accuracy parameters, (ii) content and completeness parameters, (iii) style parameters, or (iv) refinements, and cause the word processing application to present the target object on a client device.

In some aspects, at least one set of model input parameters includes the selection of resources associated with a corresponding output node identifier, one or more target-specific parameters, and instructions to cause the first generative model to generate the output data object based on the selection of resources and the one or more target-specific parameters.

In some aspects, the one or more processors are further configured to provide the modified set of model input parameters to the first generative model, receive a regenerated output data object, and update the at least one metric based on a comparison of the regenerated output data object to the corresponding structural or coverage parameter.

In some aspects, the one or more processors are further configured to cause a client device to present at least one input element configured to receive the input including the at least one machine-readable data object, and tag the at least one machine-readable data object with the one or more input node identifiers.

In some aspects, the one or more processors are further configured to cause the word processing application to present, within each annotation associated with a graphical representation, at least one graphical type for generation of a graphical object associated with the graphical representation.

In some aspects, the one or more processors are further configured to cause a client device to present at least one input element associated with the multi-level resource mapping, and receive, via the at least one input element, at least one of a confirmation or adjustment to the associations between the one or more input node identifiers and the one or more output node identifiers encoded by the multi-level resource mapping.

In some aspects, at least one of (i) the presentation of the input element or (ii) the confirmation or adjustment to the associations between the one or more input node identifiers and the one or more output node identifiers is based on one or more regulatory-specific or industry-specific parameters.

In some aspects, at least one annotation includes a flag indicating that resources corresponding to an input node identifier are missing from the at least one machine-readable data object.

In some aspects, the one or more processors are further configured to provide an audit log including a plurality of immutable timestamps generated based on a plurality of operations associated with generation of each output data object.

In some aspects, the one or more processors are further configured to provide, within the annotation generated for each output data object, a rationale supporting association of a corresponding input node identifier with the output data object.

In some aspects, the one or more processors are further configured to automatically generate and validate one or more citations associated with at least one of (i) the annotation for each output data object, (ii) each output data object, or (iii) a reference list for a target object including each output data object.

In some aspects, the one or more processors are further configured to: generate, based on each output data object included in a target object, a visual representation the resources associated with the one or more input node identifiers at a plurality of processing stages.

Some aspects relate to a method. The method can include receiving, by one or more processors coupled to memory, an input including at least one machine-readable data object divided by one or more input node identifiers. The method can include generating, by the one or more processors, a multi-level resource mapping encoding associations between the one or more input node identifiers and one or more output node identifiers. The method can include constructing, by the one or more processors, a set of model input parameters for each of the one or more output node identifiers, each set of model input parameters based on a selection of resources from the at least one machine-readable data object, the selection based on an association with one or more corresponding input node identifiers encoded by the multi-level resource mapping. The method can include providing, by the one or more processors, each set of model input parameters to a first generative model to generate an output data object for each of the one or more output node identifiers. The method can include generating, by the one or more processors, at least one metric for each output data object, the at least one metric based on a comparison of the output data object to a corresponding structural or coverage parameter. The method can include, in response to the at least one metric failing to satisfy the corresponding structural or coverage parameter, automatically generating, by the one or more processors, a modified set of model input parameters to regenerate the output data object. The method can include generating, by the one or more processors, based on a schema of a word processing application, a function that causes the word processing application to create an annotation for each output data object by (i) identifying, using a second generative model, a textual or graphical representation presented in a first region of a graphical user interface of the word processing application for each output data object and (ii) populating a body of the annotation with an indicator linking each textual or graphical representation to at least one of the one or more input node identifiers, the annotation configured to be presented in a second region of the graphical user interface of the word processing application.

In some aspects, the method further includes associating, by the one or more processors, the annotation with a portion of the output data object presented in the first region of the graphical user interface of the word processing application, and providing, by the one or more processors, the annotation for presentation in the second region of the graphical user interface of the word processing application responsive at least in part to selection of the portion of the output data object.

In some aspects, each of the one or more input node identifiers corresponds with a location of the resources from the at least one machine-readable data object, and the indicator presents the location of the resources on the word processing application via the annotation.

Some aspects relate to a non-transitory computer-readable storage medium. The non-transitory computer-readable storage medium can have one or more instructions stored thereon. The one or more instructions can be executable by one or more processors to receive an input including at least one machine-readable data object including resources divided by one or more input node identifiers. The one or more instructions can be executable by the one or more processors to generate a multi-level resource mapping encoding associations between the one or more input node identifiers and one or more output node identifiers. The one or more instructions can be executable by the one or more processors to construct, for each of the one or more output node identifiers, a set of model input parameters, each set of model input parameters based on a selection of at least a portion of the resources from the at least one machine-readable data object, the selection based on an association with one or more corresponding input node identifiers encoded by the multi-level resource mapping. The one or more instructions can be executable by the one or more processors to provide each set of model input parameters to a first generative model to generate an output data object for each of the one or more output node identifiers. The one or more instructions can be executable by the one or more processors to generate at least one metric for each output data object, the at least one metric based on a comparison of the output data object to a corresponding structural or coverage parameter. The one or more instructions can be executable by the one or more processors to, in response to the at least one metric failing to satisfy the corresponding structural or coverage parameter, automatically generate a modified set of model input parameters to regenerate the output data object. The one or more instructions can be executable by the one or more processors to generate, based on a schema of a word processing application, a function that causes the word processing application to create an annotation for each output data object by (i) identifying, using a second generative model, a textual or graphical representation presented in a first region of a graphical user interface of the word processing application for each output data object and (ii) populating a body of the annotation with an indicator linking each textual or graphical representation to at least one of the one or more input node identifiers, the annotation configured to be presented in a second region of the graphical user interface of the word processing application.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular forms of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

Figure 1:
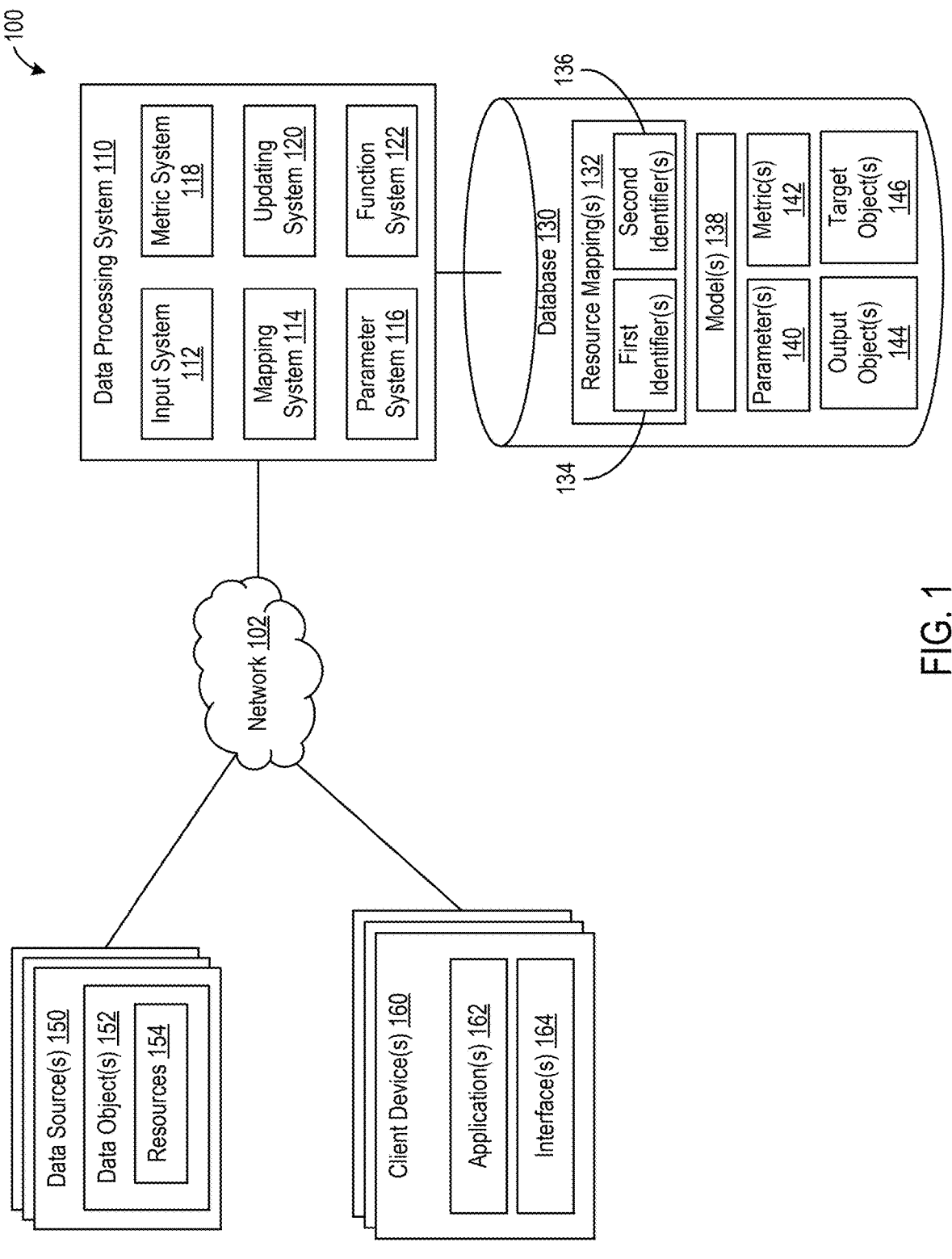
FIG. 1 is a block diagram of an example system for manuscript generation using large language models, in accordance with one or more implementations.

Below are detailed descriptions of various concepts related to, and implementations of, techniques, approaches, methods, apparatuses, and systems for manuscript generation using large language models. The various concepts introduced above and discussed in greater detail below may be implemented in any of numerous ways, as the described concepts are not limited to any particular manner of implementation. Examples of specific implementations and applications are provided primarily for illustrative purposes.

The technical solutions herein relate to systems, methods, and computer-readable storage media for generating scientific manuscripts using large language models. Technical challenges associated with manuscript generation include input size constraints, latency, and loss of source traceability when generating outputs from machine-readable data objects, such as clinical study reports, statistical analysis plans, or other scientific documentation. For example, direct ingestion of resources included in input data objects by a large language model can increase latency, processing load, or memory usage, can reduce output accuracy and introduce model hallucinations due to the size and complexity of the inputs, and may reduce traceability between source resources and corresponding output sections. The technical solutions herein address these technical challenges by generating a multi-level resource mapping that associates input node identifiers that define sections of input objects to output node identifiers that define sections of output data objects. In addition, the technical solutions herein use the associations encoded by the resource mapping to generate sets of section-specific model input parameters and prompt one or more LLMs using the input parameters to generate section-specific output objects for inclusion in a target output object. The technical solutions herein further identify each textual or graphical representation in the output object and create a function, based on the schema of a word processing application, that inserts an annotation linking the representation to a corresponding source node identifier. The annotations can be provided in a designated region of a graphical user interface of the word processing application, which improves traceability and accuracy by providing a mechanism that links each generated element back to validating resources without navigating away from an editing or reviewing environment. In addition, the annotations can provide a rationale or justification for the generated content, which can include recommendations for improvement along with a score (e.g., "exemplary," "meets standard," "needs improvement," "fails," etc.) that can be used to target adjustments to particular areas of the manuscript to improve accuracy, quality, or readability.

For example, entities such as pharmaceutical companies and related agencies engaging in scientific (e.g., medical) writing can face delays or lengthy turnaround times for regulatory and scientific content creation (e.g., plain-language summaries, clinical trial manuscripts, etc.), inconsistent content quality from outsourced vendors, challenges in facilitating compliance in a rapidly evolving regulatory landscape, limited scalability (e.g., due to a combination of increasing research output and a shortage of specialized medical writers), high costs, market opportunity loss, and delays to treatment authorization from delayed publications. The systems, methods, and computer-readable storage media herein can address these challenges by providing output content faster, more reliably and at a lower cost to customers while maintaining quality, facilitating traceability, and verifying that generated outputs comply with relevant regulatory and industry standards.

For example, delays in publication of data such as oncology clinical trial data can reduce or prevent patient access to potentially life-extending therapies. In response to publication pressures, industries such the biopharmaceutical industry may use an outsourcing model for medical writing. However, this paradigm has introduced systemic inefficiencies. For example, to meet aggressive timelines, sponsors often engage third-party vendors for first-draft manuscripts, but the quality of results from such vendors may be lacking or prompt extensive rework. This can create a dysfunctional "draft and rescue" cycle that undermines the goal of acceleration. Such challenges can be magnified for secondary manuscripts, such as Patient-Reported Outcomes (PRO) manuscripts due to the methodological complexity and stringent reporting standards used for PROs (e.g., CONSORT-PRO guidelines). For example, a generic or low-quality first draft of a manuscript may lack expected scientific and structural rigor and lead to substantial reconstruction, adding significant delays and resource burdens that interfere with timely publication of robust scientific content and prevent the introduction of scientific evidence that helps to accelerate patient access to new and effective medicines. While generative artificial intelligence (AI) may improve the trade-off between speed and quality, simple application of general-purpose Large Language Models (LLMs) may result in factual inaccuracies, superficial analyses, lack of source traceability, and increases in computing resource consumption.

In some examples, the technical solutions herein can address technical challenges and provide improvements for generating first-draft secondary manuscripts. For example, the technical solutions herein can implement a collaborative model that combines AI technology with human-in-the-loop checkpoints to provide a comprehensive and deeply structured manuscript package that can jump-start a senior medical writer in the manuscript drafting process. For example, the AI-generated output can include a fully-formed draft complete with comprehensive design explanations for figures and tables, source identifiers tracing data points and statements back to the original documentation, a transparent review of the primary literature with explanations for reference choices, dynamic citations and reference generation, and journal targeting capabilities to align the output with style guides specific to particular journals or other publishing entities. The technical solutions thus provide an AI-powered content generation platform that provides faster, higher-quality, and more compliant medical writing that supports alignment with regulatory requirements and guidelines (e.g., ICMJE, CONSORT-PRO, FDA, EU Annex V 536/2014, etc.) while reducing processing load and model hallucinations, improving output accuracy, and providing greater traceability relative to approaches that use direct model ingestion. In some examples, the technical solutions herein provide a unified interface for scientific writing tasks (e.g., medical PLS, manuscripts, abstracts, etc.), provide services for various teams (e.g., pharmaceutical in-house writing teams, agency medical writing teams, etc.), accelerate content creation by automating repetitive tasks and foundational writing work while facilitating regulatory compliance, integrate with various platforms (e.g., document management platforms, reference management platforms, submission platforms, etc.), and provide authority or explainability and enterprise-grade security for files and data management.

Referring now to FIG. 1, illustrated is a block diagram of an example system 100 for generating summaries from texts using large language models. The system 100 can include a network 102, a data processing system 110, a database 130, one or more data sources 150, and one or more client devices 160. The data processing system 110 can include an input system 112, a mapping system 114, a parameter system 116, a metric system 118, an updating system 120, and a function system 122. The database 130 can include one or more resource mappings 132 with one or more first identifiers 134 and one or more second identifiers 136. The database 130 can further include one or more models 138, one or more parameters 140, one or more metrics 142, one or more output objects 144, and one or more target objects 146. The data sources 150 can include one or more data objects 152 with resources 154. The client devices 160 can include one or more applications 162 and one or more interfaces 164.

Figure 10:
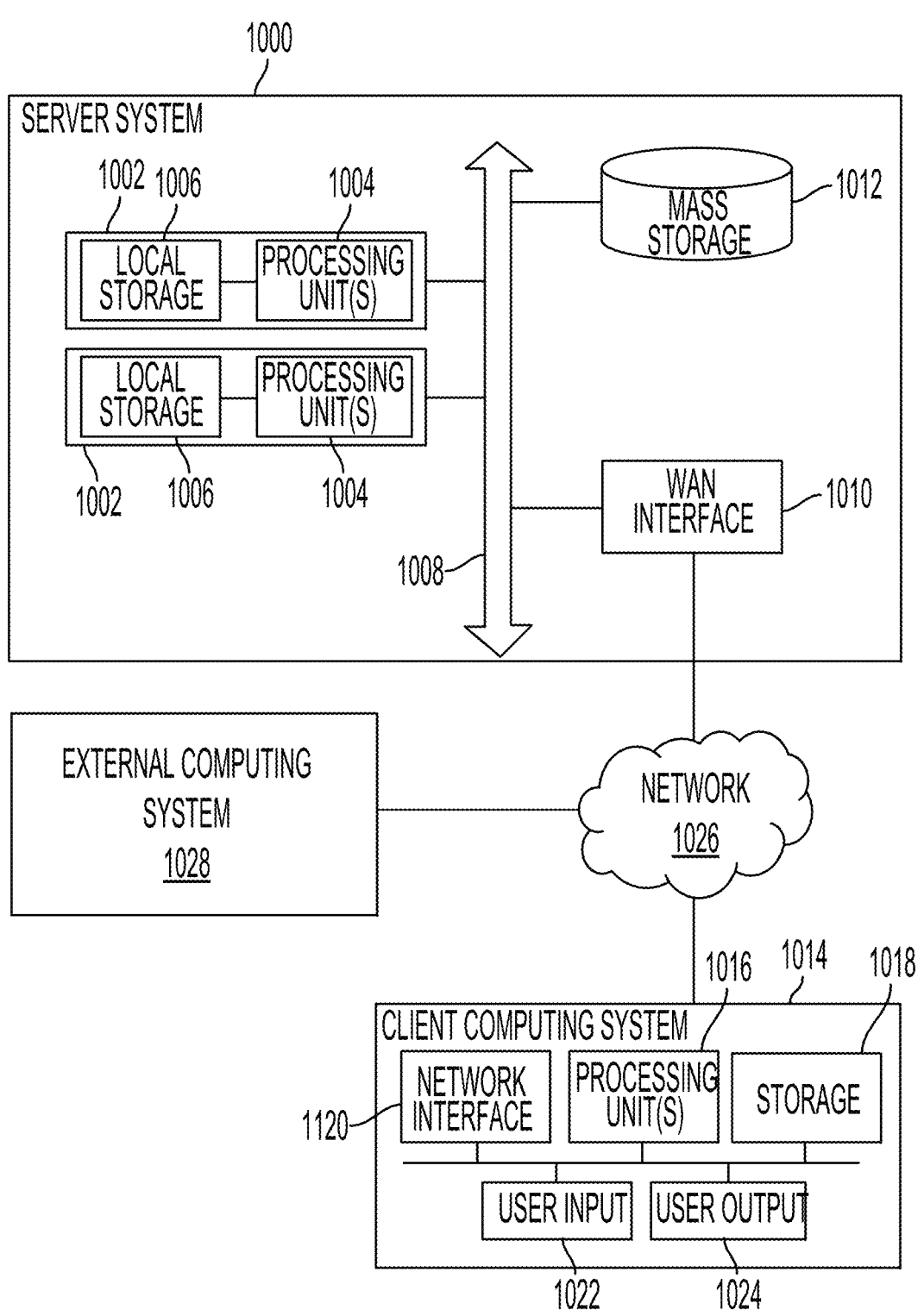
FIG. 10 illustrates an example block diagram depicting implementations of computing devices used in connection with the methods ad systems described herein, in accordance with one or more implementations.

In some examples, the systems, devices, or components of FIG. 1 (e.g., data processing system 110, input system 112, mapping system 114, parameter system 116, metric system 118, updating system 120, function system 122, database 130, data sources 150, client devices 160, etc.) can be implemented using the hardware components or a combination of software with the hardware components of a computing system, such as the computing system depicted in block diagram 1000 detailed herein in conjunction with FIG. 10, or any other computing system described herein. In some examples, one or more (e.g., at least one, each, etc.) of the components of the data processing system 110 can perform the functionalities herein.

In some examples, the network 102 can include computer networks such as the Internet, local, wide, metro or other area networks, intranets, satellite networks, other computer networks such as voice or data mobile phone communication networks, or combinations thereof. The data processing system 110 of the system 100 can communicate via the network 102 with one or more computing devices, such as the data sources 150 or client devices 160. The network 102 may be any form of computer network that can relay information between the data processing system 110, the data sources 150, and the client devices 160. In some implementations, the network 102 may include the Internet and/or other types of data networks, such as a local area network (LAN), a wide area network (WAN), a cellular network, a satellite network, or other types of data networks. The network 102 may also include any number of computing devices (e.g., computers, servers, routers, network switches, etc.) that are configured to receive or transmit data within the network 102.

In some examples, the network 102 may further include any number of hardwired or wireless connections. Any or all of the computing devices described herein (e.g., the data processing system 110, client devices 160, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 102. Any or all of the computing devices described herein may also communicate wirelessly with the computing devices of the network 102 via a proxy device (e.g., a router, network switch, or gateway).

In some examples, the data processing system 110 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), a graphics processing unit (GPU), a tensor processing unit (TPU), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 110 can include one or more computing devices or servers that can perform various functions as described herein. The data processing system 110 can include any or all of the components and perform any or all of the functions of the computing devices of block diagram 1000 described herein in conjunction with FIG. 10.

In some implementations, the data processing system 110 establish one or more communication sessions with the client devices 160. A communication session can include a channel or connection between the data processing system 110 and a respective client device 160. The one or more communication sessions can each include an application session (e.g., virtual application), an execution session, a desktop session, a hosted desktop session, a terminal services session, a browser session, a remote desktop session, a URL session or a remote application session. Each communication session can include encrypted or secure sessions, which can include an encrypted file, encrypted data, or traffic.

In some examples, client device 160 can be a personal computer, a laptop computer, a television device, a smart phone device, a mobile device, or another type of computing device. Each of the client devices 160 can include at least one processor and a memory (e.g., a processing circuit), and can be implemented using hardware or a combination of software and hardware. The memory can store processor-executable instructions that, when executed by the processor, cause the processor to perform one or more of the operations described herein. The processor can include a microprocessor, an ASIC, an FPGA, a GPU, a TPU, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 160 can include one or more computing devices or servers that can perform various operations as described herein.

In some examples, each client device 160 can include or execute an application 162. The application 162 can include a local application (e.g., local to a client device 160), hosted application, a SaaS application, a virtual application, a mobile application, or other forms of content. In some implementations, the application 162 can include or correspond to applications provided by remote servers or third-party servers. In some implementations, the application 162 can be used to access or interface with the data processed by the data processing system 110 or stored by the database 130. In some examples, the application 162 can generate one or more interactive user interface elements through the user interface 164. Some example interactive user interface elements can include user-selectable hyperlinks, buttons, graphics, videos, images, or other application features. Interactions with such interactive user interface elements can cause the application 162 executing on the respective client device 160 to generate a signal, which can cause the application 162 to perform further operations corresponding to the interaction. The application 162 may be or include a web browser application or a native application, which may be used to access the functionality of the data processing system 110, as described herein.

In some examples, each client device 160 can include one or more interfaces 164. An interface 164 can be a display or display portion. The interface 164 can include a display portion of a television, a display portion of a computing device, a GUI, or another type of interactive display (e.g., a touchscreen, a display, etc.) and one or more I/O devices (e.g., a mouse, a keyboard, digital keypad). The interface 164 can present the application 162 executing on the client device 160. The interface 164 can include a touch screen which can display the application 162 and receive input from a user. The client device 160 may also receive interactions via any other type of I/O device. Each client device 160 can include an input device that couples or communicates with the interface 164 and can process inputs received via the interface 164 to interact with the application 162 executing on the client device 160. The application 162 may receive data from the data processing system 110 via the network 102 for display on the interface 164. The application 162 may transmit data or inputs received from the interface 164 to the data processing system 110.

In some examples, the client device 160 can include multiple applications providing multiple interfaces for manuscript generation, review, or modification. For example, a first application 162 can correspond to a manuscript generation platform and include or execute a first interface 164 with one or more graphical elements corresponding to the manuscript generation platform. The first interface 164 can present controls for uploading source materials, initiating manuscript generation, viewing generated sections, applying validation checks, or exporting outputs. For example, a second application 162 can correspond to a third-party application, such as a word processing application, and include or execute a second interface 164 with one or more graphical elements corresponding to the third-party application. The second interface 164 can present controls for viewing and editing output content, inserting or modifying content, adding annotations, or tracking changes. The second interface 164 can also display annotations generated by the data processing system 110 that link textual or graphical elements in the manuscript to corresponding source materials to facilitate review and modification within the third-party application environment (e.g., rationales and/or justifications including output improvement recommendations, content scores, etc.). In some examples, the first application/interface and the second application/interface can be combined or presented in combination via a unified manuscript generation platform. In some examples, the unified manuscript generation platform provided by the application 162 and interface 164 can include integrations with internal or third-party platforms (e.g., document management platforms, reference management platforms, etc.) and can provide audit trails (e.g., immutable timestamp logs of executed operations by the data processing system 110), explainability or other outputs (e.g., Preferred Reporting Items for Systematic Reviews and Meta-Analyses (PRISMA) diagrams, etc.), and enterprise-grade security features for files and data management (e.g., access controls, encryption, secure storage, data integrity checks, recovery procedures, etc.).

In some examples, the data processing system 110 may communicate with the data sources 150, for example, to receive or retrieve the machine-readable data objects (e.g., source materials) from the data sources 150. The data processing system 110 may communicate with the client devices 160, for example, to provide and to receive user input, or to provide outputs (e.g., output data objects, targets objects, annotations, etc.) via the network 102. In some examples, the data processing system 110 can be or can include an application server or webserver, which may include software modules allowing various computing devices (e.g., the client devices 160, data sources 150, etc.) to access or process data stored by the data processing system 110 or database 130. For example, the data processing system 110 may include a webserver allowing the client devices 160 to access data that is collected and processed by the data processing system 110. For example, user associated with a client device 160 may access the functionality of the data processing system 110 by executing a web browser application and access a website hosted on the webserver in order to access data.

In some examples, the data sources 150 can include any database, server, data repository, or other system or device including source materials (e.g., data objects 152). For examples, the data sources 150 can include research databases, medical databases, external servers including articles, university databases, or other data providers or sources. The data sources 150 can include one or more computing systems and be configured for communication via the network 102. In some examples, the client devices 160 can retrieve data objects 152 from the data sources 150 and upload or provide the data objects 152 to the data processing system 110 for processing. The data objects 152 can include machine-readable representations of one or more Clinical Study Reports (CSRs), study protocols, statistical analysis plans (SAPs), primary manuscripts, congress posters, kick-off call notations and tables, figures, and listings (TFLs), or other textual, visual, or graphical content (e.g., any type of text, paper, journal, essay, or paper) used to generate target objects 146 (e.g., generated manuscripts). For example, the data objects 152 can include scientific publications, clinical study reports, journal articles, conference notes, presentation slides, or other documentation or materials.

The data objects 152 can include resources 154. For example, the resources 154 can include any textual, graphical, or other types of content (e.g., text, images, figures, charts, graphs, or other such visual displays) included in the source materials. For example, the resources 154 can include sentences including strings of alphanumeric characters terminated by one or more punctuation marks, including periods, exclamation points, and question marks. For example, the resources 154 can include graphics such as charts, graphs, images, or other visual content. In some examples, the resources 154 can include text or graphics formatted into one or more sections. Each section can include corresponding subject matter divided by respective input node identifiers (e.g., first identifiers 136). For example, a first section may include text related to background material of a source article and include a first identifier 136 that identifies a heading or label of the first section (e.g., "Background") within the source article.

The database 130 can be a computer-readable memory that can store or maintain any of the information described herein. The database 130 can be accessed using one or more memory addresses, index values, or identifiers of any item, structure, or region maintained in the database 130. The database 130 can be accessed by the components of the data processing system 110, or any other computing device described herein, via the network 102. In some implementations, the database 130 can be internal to the data processing system 110. In some implementations, the database 130 can be external to the data processing system 110, and may be accessed via the network 102. The database 130 can be distributed across computer systems or storage elements, and may be accessed via the network 102 or a suitable computer bus interface. The data processing system 110 can store, in one or more regions of the memory of the data processing system 110 or in the database 130, inputs or outputs associated with the various operations described herein.

In some examples, the database 130 can include one or more resource mappings 132. For example, the resource mappings 132 can include a multi-level data structure storing associations between one or more first identifiers 134 and one or more second identifiers 136. For example, the first identifiers 134 can include input node identifiers that identify respective sections or subsections of a data object 152, the second identifiers 136 can include output node identifiers that identify respective sections or subsections of a target object 146 (e.g., output manuscript), and the resource mappings 132 can store links that encode associations between the first identifiers 134 and the second identifiers 136. In some examples, the resource mappings 132 can include second identifiers 136 corresponding to a structure based on one or more regulatory guidelines or formats (e.g., CONSORT-PRO guidelines). The resource mappings 132 can be structured using various types of data representations (e.g., JSON objects) that maintain hierarchical structures of keys and values. For example, the resource mappings 132 can include keys for output sections (e.g., second identifiers 136) with values storing corresponding keys for input sections (e.g., first identifiers 134).

For example, a second identifier 136 corresponding to a "Study Design and Participants" section of an output manuscript can be associated with one or multiple first identifiers 134 corresponding to one or more input sections used in generating the corresponding output section, such as "1.4 Study design," "FIG. 1 Study design," "2.1 Primary objectives," "2.3 Secondary objectives," "5.3.1 Clinical Outcome Assessments," "10.1 Ethical conduct of the study," and "10.4 Informed consent." In some implementations, the resource mappings 132 can be generated automatically by querying structural metadata (e.g., table of contents entries, section headers, figure captions) of the input data objects 152. In some examples, the resource mappings 132 can be updated or reviewed via a human-in-the-loop process to verify correct alignment between input and output section mappings.

In some examples, the database 130 can include one or more models 138. For example, the models 138 can include one or more multiple machine learning models for generating output content (e.g., output objects 144, target objects 146, etc.) based on the inputted data objects 152 or validating output content based on the inputted data objects 152. The models 138 can include models such as Bag-of-Words, word embedding, or language models. The models 138 can be executed by the data processing system 110 or generate outputs in response to prompts (e.g., model input parameters) provided by the data processing system 110. For example, the models 138 can implement natural language processing techniques such as Bidirectional Encoder Representations from Transformers (BERT), Word2Vec, or Term Frequency-Inverse Document Frequency (Tf-Idf), among others. The models 138 can include large language models (LLM). A large language model can include language models above a threshold size to generate text based on prompts. An LLM can include a neural network, and the size of an LLM can correspond to a number of nodes of a neural network, an amount of weights of the neural network, or an amount of biases of the neural network, among others. In some example, a large language model can take text as input to generate output text, validate aspects of the input text (e.g., accuracy, completeness, etc.), or perform other operations (e.g., classification). Examples of large language models can include Generative Pre-training Transformer (GPT), FLAN-T5, text-bison@001, Pathways Language Model (PaLM), Large Language Model Meta AI (LLaMa), or Big-science Large Open-science Open-access Multilingual Language Model (BLOOM).

In some examples, the database 130 can include parameters 140. For example, the parameters 140 can include attributes or characteristics that are used to validate or control the generation of output content (e.g., output objects 144, target objects 146, etc.) produced by the models 138. For example, the parameters 140 can include one or more sets of model input parameters. The sets of model input parameters can include prompts for models 138 (e.g., LLMs) that control how the models 138 generate output text. For example, a set of model input parameters can be configured for an output section to be generated and can include one or more output node identifiers (e.g., second identifiers 136) corresponding to the output section, input node identifiers (e.g., first identifiers 134) that indicate a location of resources within the source documents (e.g., data objects 152) that are used to generate output content (e.g., output objects 144) for the output section, or additional parameters. For example, the additional parameters can include operational constraints (e.g., token count limits, memory limits, processing time limits), semantic controls (e.g., tone or voice or persona controls, keyword lists, prohibited terms, language register settings), compliance controls (e.g., guideline checklists, reference validation, citation formats), metadata (e.g., resource type, origin, confidence score), formatting specifications (e.g., propriety or third party guidelines, table structures, figure instructions, numbering conventions), or model behavior modifiers (e.g., temperature, beam search, context window size).

In some examples, the parameters 140 can include structural parameters, coverage parameters, or other types of parameters (e.g., target-specific parameters corresponding to a publishing body or journal, etc.) used to validate output objects 144 or target objects 146 and generate metrics 142. The structural, coverage, or other types of parameters can include scientific accuracy measures, content and completeness measures, polishing and professionalism measures, or high-impact refinement measures. For example, the structural, coverage, or other types of parameters can include measures of whether an abstract section states a primary efficacy outcome (e.g., a stated efficacy outcome matches a source), whether an introduction maintains fair balance (e.g., a view or tone is consistent with a source), whether a discussion links back to primary findings, whether statistical powering of PROs are accurately reflected, whether appropriate statistical language is adhered to (e.g., language aligns with language of source), whether use of particular words or phrases are restricted (e.g., the term "significant"), measures of data relevance and scope (e.g., alignment with source materials), measures of data precision (e.g., numerical data points precisely matching source data points), whether source annotations are included (e.g., complete reference list with in-text citations and source traceability), whether conflicting information is included (e.g., data presented in a first section does not contradict with data presented in a subsequent section), whether PROs are correctly identified as secondary and/or exploratory (e.g., designations in source materials are maintained), or whether adherence is to ethical guidance is stated (e.g., all patients provided informed consent, etc.).

In some examples, the structural, coverage, or other types of parameters can include measures of whether a title is specific (e.g., includes key elements from source title), whether an abstract structure is correct (e.g., contains purpose, methods, results, and conclusions), whether abstract content is complete and correct (e.g., summarizes key findings, compliance rates, and defines abbreviations), whether an introduction provides context (e.g., describes disease, unmet need, and prior standard of care), whether an introduction justifies analysis (e.g., states importance of patient experience), whether methods cite primary manuscript and describe participants (e.g., patient population matches source), whether methods define instruments and validity (e.g., names and cites validation of PRO tools), whether methods detail PRO administration (e.g., describes collection method and timing), whether PRO assessment schedule is accurately described (e.g., matches source schedule), whether analysis population and concepts are defined (e.g., defines clinically meaningful change threshold), whether statistical models and methods are detailed (e.g., describes log-rank tests, Cox models, MMRM), whether participant flow is described (e.g., number of patients in analysis set matches source), whether PRO compliance is reported (e.g., rates match source tables), whether baseline scores are reported (e.g., comparable scores noted), whether relevant adverse events are mentioned (e.g., fatigue, nausea), whether findings and implications are interpreted (e.g., survival benefit without detriment to patient experience), whether findings are contextualized with literature (e.g., compares to ABC-02 trial), whether strengths, limitations, and biases are evaluated (e.g., randomized design, attrition bias), whether future research is suggested (e.g., long-term QOL, biomarker correlation), whether key PRO endpoint data is included (e.g., TTD for GHS/QOL reported), or whether new results are introduced in discussion (e.g., numerical improvement rates not in results)

In some examples, the structural, coverage, or other types of parameters can include measures of adherence to a format or structure is maintained (e.g., follows IMRAD structure including an introduction, methods, results, analysis, and discussion section), whether the manuscript tells a cohesive story (e.g., logical flow and smooth transitions), whether redundancy is avoided (e.g., results summarized without repeating all table data), whether language is precise and unambiguous (e.g., abbreviations defined at first use), whether "throw-away" statements are avoided (e.g., no empty introductory phrases), whether terminology is consistent (e.g., BTC, durvalumab, PRO instrument names used consistently), whether table and figure callouts are correct (e.g., numerical order maintained), whether tables have clear titles and footnotes (e.g., descriptive titles provided), whether visuals are appropriately summarized in text (e.g., figures described concisely), whether tone is formal, objective, and unbiased (e.g., data-driven style), whether manuscript is free of grammatical errors (e.g., no spelling or punctuation issues), whether references are correctly listed and cited (e.g., all in-text citations match reference list), whether PRO instrument selection is justified (e.g., QLQ-C30 widely used and validated, QLQ-BIL21 developed for BTC), whether translation into patient voice is present (e.g., survival benefit described in terms of patient experience), whether data formatting is consistent (e.g., decimal places, CI format), whether core message alignment is maintained (e.g., abstract and conclusion emphasize same core message), or whether awareness of journal conventions is shown (e.g., length, structure, abstract word count are appropriate).

In some examples, the database 130 can include metrics 142. For example, the metrics 142 can include quantitative or qualitive scores or indicators associated with parameters 140 (e.g., with structural parameters, coverage parameters, or other types of parameters used to evaluate output objects 144 or target objects 146). In some examples, the metrics 142 can include numerical ratings, percentage scores, pass-fail indicators, threshold comparisons, or other structured information indicating a degree of compliance or satisfaction associated with parameters 140. The metrics 142 can be generated using one or more models 138. For example, the data processing system 110 can provide inputs including output objects 144 or target objects 146 to the models 138, and the models 138 can process the inputs and compute or derive metrics 142 corresponding to individual output objects 144 (e.g., portions of a target object 146) or aggregated output objects 144 (e.g., combinations of output sections). In some examples, multiple metrics 142 can be combined to generate an overall score for a target object 146. The metrics 142 can be provided for human-in-the-loop review or used by the models 138 to refine or regenerate output objects 144.

In some examples, the database 130 can include output objects 144. The output objects 144 can include textual content (e.g., paragraphs, titles, labels, citations, etc.) or visual content (e.g., images, graphs, charts, tables, etc.) generated by the models 138 based on sets of model input parameters corresponding to specific output sections or subsections of an overall manuscript (e.g., target object 146). In some examples, the output objects 144 can correspond to one or more expected formats, predefined structures, or guidelines (e.g., CONSORT-PRO guidelines). For example, at least one first output object 144 can include content for a "title" section, at least one second output object 144 can include content for an "abstract" section (e.g., with induvial output objects 144 for "purpose," "methods," "results," and "conclusion"), at least one third output object can include content for an "introduction" section, at least one fourth output object can include content for a "methods" section (e.g., with individual output objects 144 for "study population and participant flow," "questionnaire compliance rates," "baseline scores," "time to deterioration in PROs," "change from baseline in PROs," and "improvement rate), at least one fifth output object 144 can include content for a "discussion" section, and at least one sixth output object 144 can include content for a "references" section. In some examples, the data processing system 110 can aggregate or combine the output objects 144 to generate a target object 146 (e.g., output manuscript).

In some examples, the data processing system 110 can execute or perform one or more operations for scientific manuscript generation. In some examples, the data processing system 110 can cause or include one or more subsystems to execute or perform one or more operations for scientific manuscript generation (e.g., input system 112, mapping system 114, parameter system 116, metric system 118, updating system 120, function system 122, etc.). Each of the subsystems of the data processing system 110, such as the input system 112, mapping system 114, parameter system 116, metric system 118, updating system 120, and function system 122, can include any combination of hardware and software (e.g., one or more processors and memory) configured to execute or perform the operations described herein.

The data processing system 110 or input system 112 can receive an input. In some examples, the input can include at least one machine-readable data object including resources divided by one or more input node identifiers. For example, the data processing system 110 or input system 112 can receive one or more data objects 152 including source materials provided or uploaded via the client device 160 using application 162 or interface 164. The source materials (e.g., resources 154) can be divided or structured into sections or subsections represented by input node identifiers (e.g., first identifiers 134). In some examples, receiving can include the data processing system 110 or input system 112 extracting text, figures, tables, or metadata from the source materials. For example, extraction can include parsing raw text, document headers, table of contents entries, figure captions, or section labels to identify discrete resources included in the source materials. Additionally, receiving the input can include converting the source materials into a structured format (e.g., JSON) with each section or subsection stored as a separate element 1 (e.g., value) inked to a corresponding input node identifier (e.g., key).

The data processing system 110 or mapping system 114 can generate a mapping. In some examples, the mapping can include a multi-level resource mapping encoding associations between the one or more input node identifiers and one or more output node identifiers. For example, the data processing system 110 or mapping system 114 can populate a resource mapping 132 including a predefined structure of output sections with links to corresponding input sections extracted from the data objects 152. In some examples, generating the mapping can include the data processing system 110 or mapping system 114 inserting each output node identifier as a top-level key and linked to one or more input node identifiers represented as values or lower-level keys. Additionally, generating the mapping can include automatically matching input node identifiers to output node identifiers based on section titles, metadata tags, or other structural indicators included in the source materials. For example, generating the mapping can include parsing or analyzing the input content using machine learning or keyword matching techniques to align source resources to respective output sections. In some examples, generating the mapping can include structuring one or more output node identifiers to correspond with output sections expected for a target object 146 (e.g., using CONSORT-PRO guidelines).

The data processing system 110 or parameter system 116 can construct model input parameters. In some examples, the data processing system 110 or parameter system 116 can construct, for each of the one or more output node identifiers, a set of model input parameters. For example, the data processing system 110 or parameter system 116 can generate LLM prompts including instructions, constraints, or other information used by the models 138 to generate output content (e.g., output objects 144). In some examples, each set of model input parameters can be based on a selection of at least a portion of the resources from the at least one machine-readable data object, and the selection can be based on an association with one or more corresponding input node identifiers encoded by the multi-level resource mapping. For example, the data processing system 110 or parameter system 116 can analyze the resource mapping 132 to identify source resources linked to a particular output section and generate at least one prompt that includes or references the source resources such that the models 138 use the source resources in generating output content for the particular output section. In some examples, the model input parameters can include baseline instructions applicable to multiple output sections (e.g., completeness levels, expected accuracy measures, formatting standards, etc.) or instructions that correspond to the particular output section being generated (e.g., requiring bullet points for a discussion section due to journal discouraging or prohibiting AI from drafting that section, providing restrictions for exact matches when numerical data is included in the source materials, requiring inclusion of particular resource types such as text or graphics, etc.).

The data processing system 110 or parameter system 116 can provide model input parameters. For example, the data processing system 110 or parameter system 116 can provide each set of model input parameters to a first generative model to generate an output data object for each of the one or more output node identifiers. In some examples, providing the model input parameters can include transmitting, prompting, or otherwise supplying a set of structured inputs to a generative model such that the generative model produces a corresponding output data object. For example, providing can include the data processing system 110 or parameter system 116 prompting or calling at least one model 138 via an endpoint, application programming interface (API), or other communication interface. In some examples, providing can include iteratively providing multiple sets of input parameters to the generative model to cause the generative model to generate multiple output objects corresponding to particular output sections of the output manuscript.

The data processing system 110 or metric system 118 can generate one or more metrics. For example, the data processing system 110 or metric system 118 generate at least one metric for each output data object, and the at least one metric can be based on a comparison of the output data object to a corresponding structural or coverage parameter. In some examples, generating can include deriving or computing metrics 142 by applying rule-based validators, statistical checks, or machine learning models to evaluate the quality, accuracy, or compliance of one or multiple output objects 144. For example, a metric can indicate whether a generated statement is traceable to a source resource identified by the corresponding input node identifier, whether a section contains expected content elements defined by a guideline or template, or whether numerical values in the output data object match numerical values in the source materials. In some examples, the metrics can include quantitative indicators (e.g., numerical scores, percentages, or threshold comparisons) or qualitative indicators (e.g., flags, categorical classifications, or labels) that provide feedback on the degree of alignment between the generated outputs corresponding structural or coverage parameters. In some examples, the metrics can be stored in the database 130 or associated with the corresponding output data objects 144 for further use in refinement or validation operations (e.g., regeneration of model prompts).

The data processing system 110 or updating system 120 can modify model input parameters. For example, in response to the at least one metric failing to satisfy the corresponding structural or coverage parameter, the data processing system 110 or updating system 120 can automatically generate a modified set of model input parameters to regenerate the output data object. In some examples, modifying can include the data processing system 110 or updating system 120 adjusting constraints or instructions within the model input parameters to correct deficiencies identified by the metrics and providing the adjusted constraints or instructions to the generative models for reprocessing. For example, modifying can include adding or removing resources linked to a particular input node identifier, adjusting accuracy requirements, inserting compliance-related instructions (e.g., checklist items, prohibited terms, etc.), or adjusting formatting directives. In some examples, modifying can include selecting a different generative model from the models 138, altering model behavior parameters (e.g., temperature, beam width, token limits), or reordering or rearranging inputs. In some examples, regenerating can include iterative refinement, where additional rounds of modification and metric comparisons are performed and terminated when regenerated output data object satisfies corresponding structural or coverage parameters.

The data processing system 110 or function system 122 can generate a function. In some examples, the data processing system 110 or function system 122 can generate, based on a schema of a word processing application, a function that causes the word processing application to create an annotation for each output data object. The function can include or refer to a script, macro, API call, or other type of instruction configured for execution with the word processing application. For example, the function can (i) access or create an annotation repository for a document presented on the word processing application (e.g., a comments part, note store, or equivalent container), (ii) define an anchor that targets a text span or graphical placeholder in the document model, and (iii) populate fields of the annotation with structured metadata including an identifier for the corresponding output data object, one or more linked input node identifiers, author/source metadata, a timestamp, and a body containing validation text or compliance notes. In some examples, generating can include packaging the annotation as structured data compatible with a document model of the third party application (e.g., Open XML elements, OpenDocument constructs, or JSON payloads accepted by an editor API) such that the function inserts the annotation in accordance with a schema of the application.

In some examples, generating can include the data processing system 110 or function system 122 identifying, using a second generative model, a textual or graphical representation presented in a first region of a graphical user interface of the word processing application for each output data object. Identifying can include parsing a rendered document model to detect sentences, paragraphs, table cells, figure captions, figure placeholders, or other selectable ranges, and resolving each detected range to a corresponding location reference in the document model. In some examples, generating can include the data processing system 110 or function system 122 populating a body of the annotation with an indicator linking each textual or graphical representation to at least one of the one or more input node identifiers, and the annotation can be configured to be presented in a second region of the graphical user interface of the word processing application. For example, the function can cause the word processing application to display the annotation in a margin, sidebar, or comment pane separate from or overlaid on a document viewing window including the generated output content. For example, the function can cause the word processing application to display one or more indicators representing a link to the input node identifier, a source-location hint (e.g., section label, table number, figure identifier), a rationale or validation note, or compliance data corresponding to structural or coverage parameters. In some examples, the function can be configured to cause the word processing application to attribute the annotation to a designated author identity, associate the annotation with a timestamp, and insert selection anchors such that selecting the textual or graphical representation in the first region of the word processing application causes the corresponding annotation to be revealed, highlighted, or navigated to in the second region.

Referring generally to FIGS. 2-9, example flow diagrams of methods 200-900 for various aspects of manuscript generation using large language models are shown, in accordance with one or more implementations. One or more steps or operations of the methods 200-900 can be executed or implemented by one or more systems or subsystems described with regard to FIG. 1 (e.g., a computing system, one or more processors, data processing system 110, input system 112, mapping system 114, parameter system 116, metric system 118, updating system 120, function system 122, database 130, data sources 150, client devices 160, etc.). In some examples, one or more steps or operations of the methods 200-900 can be reordered, removed, combined, added, adjusted, or otherwise modified.

Figure 2:
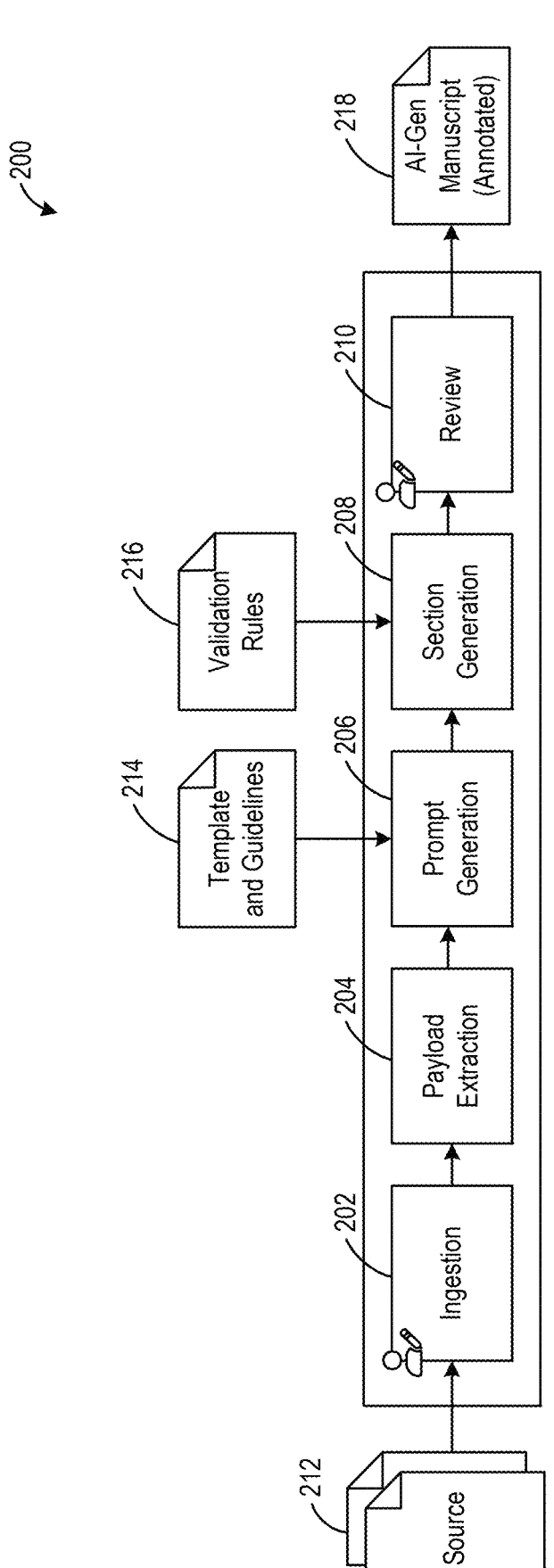
FIG. 2 illustrates an example flow diagram of a method for manuscript generation using large language models, in accordance with one or more implementations.

Referring to FIG. 2, an example flow diagram of a method 200 for manuscript generation using large language models is shown. In some examples, at step 202, the method 200 can include ingestion. For example, a data processing system (e.g., data processing system 110) system can ingest source materials 212. The source materials 212 can include clinical study reports (CSRs), study protocols, statistical analysis plans (SAPs), primary manuscripts, or other supporting content. In some examples, ingestion can include uploading one or more files via a client device or retrieving the files from a data source, verifying a file format, and converting the files into structured data objects. For example, the source materials 212 can be provided in various formats (e.g., PDF, CSV, JPEG, DOCX, etc.). In some examples, ingestion can include converting the source materials 212 into a structured representation (e.g., JSON) in which each section or subsection of a source document is tagged as a separate element (e.g., dictionary entry) keyed by a section identifier. In some implementations, ingestion can further include generating an automated summary of each table or figure contained in the source document to facilitate downstream processing. In some examples, ingestion can include applying standard templates or guidelines (e.g., ICH E3 guidelines for clinical study reports, ICMJE guidelines for primary manuscripts, etc.) such that the source content is properly structured for subsequent operations.

In some examples, at step 204, the method 200 can include payload extraction. For example, the data processing system 110 can generate a structured payload that associates source content with output manuscript sections. In some implementations, payload extraction can include applying a predefined or auto-generated mapping between input node identifiers representing sections or subsections of the source materials 212 and output node identifiers representing sections or subsections of a target manuscript (e.g., AI-generated manuscript 218). For example, a payload for a "methods" section of an output manuscript can include multiple nested output node identifiers (e.g., "study deign and participants" identifier with a "references" identifier and "primary manuscript" identifier, etc.) each including one or more input node identifiers that identify section or subsection titles indicative of source locations across one or more input documents. In some examples, payload extraction can include parsing tables of contents, section headers, figure captions, or metadata of the source materials 212 to populate the mapping with additional input node identifiers from the source (e.g., figure names or numbers, table names or numbers, etc.). In some examples, payload extraction can be automated by a mapping system and include a human-in-the-loop review to confirm correctness of the associations (e.g., when multiple candidate source sections are available). The extracted payload can be represented in a structured format (e.g., JSON object) that encodes relationships between output node identifiers and corresponding input node identifiers.

In some examples, at step 206, the method 200 can include prompt generation. For example, the data processing system 110 can apply one or more templates 214 to the structured payload extracted in step 204 to generate prompts for each output section or subsection. In some implementations, a template can define the hierarchy of sections and subsections expected in the target manuscript (e.g., introduction, methods, results, discussion, references, tables, figures) and provide prompt instructions tailored to each subsection. For example, a template can include prompt structures for "study design and participants," "patient-reported outcomes," or "statistical analyses," each linked to the corresponding payload elements identified in step 204. In some examples, generating prompts can further include incorporating guideline-based instructions (e.g., CONSORT, CONSORT-PRO, ICMJE, or other publication standards) and style directives (e.g., general formatting guidelines or proprietary instructions). In some implementations, the data processing system 110 can merge the extracted payload items with the applicable template and guideline constraints to produce prompt text that instructs a generative model to generate content that is complete, compliant, and stylistically consistent.

In some examples, at step 208, the method 200 can include output generation. For example, the data processing system 110 can provide the generated prompts including the extracted payload and one or more additional parameters (e.g., persona definitions, target-specific parameters, etc.) to one or more generative models to cause the models to generate output content. For example, the persona definition can specify a tone, style, or role (e.g., "specialist medical writer drafting a patient-reported outcome (PRO) scientific manuscript") used for generation of the output content. For example, the target-specific parameters can include instructions that correspond with style, tone, or content expected for a target journal or publishing target. In some examples, the generative model can process the prompt, payload, and additional parameters to generate draft content for each section or subsection of the output manuscript. In some implementations, output generation can include combining or aggregating generated textual passages, tables or figures, captions, labels, citations, or other textual or visual content to produce a complete draft of an output manuscript (e.g., AI-generated manuscript 218).

Output generation can also include generating and providing a JSON list of annotations (e.g., for presentation via a word processing application) that link each portion of generated output content to corresponding input content (e.g., including an input section identifier and justification or rationale) or provides a flag (e.g., via an embedded highlight function of the word processing application) that indicates corresponding source content is missing or unavailable. In some examples, output generation can further include applying validation rules 216 to the generated content to verify structure, coverage, or compliance. For example, applying the validation rules 216 can include performing automated compliance and benchmarking checks in accordance with ICMJE guidelines or internal benchmarking rubrics, promotional language checks, spelling and grammar checks, source checks (e.g., against ingested source documents), reference credibility checks, or concept checks (e.g., against industry standard frameworks). In some examples, reference credibility checks can include confirming that any citation mentioned in the generated output aligns with the references listed at the base of the output document, confirming that the references in the document include all but no more than the references listed in a reference collection (e.g., a data structure storing references associated with the output document that is generated during ingestion/output generation), or processing the collected full texts within the reference collection and cross-referencing the full texts against the corresponding statements the references are attributed to (e.g., producing a short summary statement that justifies the inclusion of reference in question). In some examples, benchmarking can include benchmarking against published PRO manuscripts by extracting content from both published and AI-generated manuscripts, generating a comparative representation (e.g., Venn diagram) to measure the degree of overlap between the published and AI-generated manuscripts, and comparing the degree of overlap to a threshold (e.g., 90% to qualify or make template changes).

In some examples, the method 200 can further include post-process cleanup. For example, the data processing system can update the generate outputs to expand acronyms, extract references, or perform figure and table renumbering. In some examples, the method 200 can further include application of metrics. For example, the data processing system can generate metrics for the generated output based on predefined targets and, if the metrics do not satisfy the targets (e.g., thresholds), the data processing system can adjust the prompts generated at step 206 and repeat output generation at step 208. In some examples, the method 200 can further include running AI validation of the generated content. For example, the data processing system can use an AI model to perform source validation (e.g., verifying that each statement of the generated content is linked back to some resources in the provided source material), to provide reference suggestion (e.g., providing references supporting particular statements included in the output), to provide figure and table suggestions (e.g., providing a comment that describes where to find the source data used to populate each figure or table, a suggestion of the type of figure to use (e.g., forest plot), additional notes, etc.), or to provide verification of compliance with guidelines (e.g., providing a separate report assessing compliance with the CONSORT and CONSORT-PRO guidelines).

In some examples, at step 210, the method 200 can include review. For example, the data processing system can provide the output manuscript to a user interface of a subject matter expert to receive additional input (e.g., modifications, adjustments, etc.) or approval. In some examples, the data processing system can provide the output manuscript in various formats (e.g., DOCX, PDF, XML, HTML, etc.). In some examples, the method 200 can include providing analytics related to manuscript generation, such as analytics content quality, turnaround time, or compliance.

Figure 3:
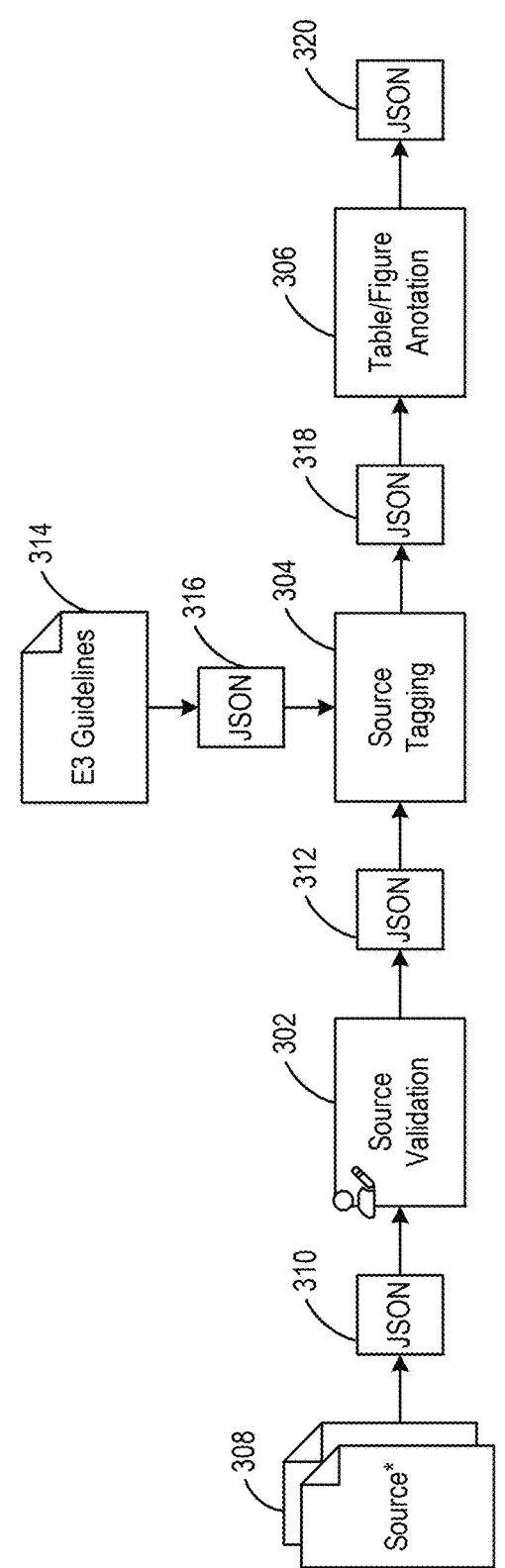
FIG. 3 illustrates an example flow diagram of a method for ingestion, in accordance with one or more implementations.

Referring to FIG. 3, an example flow diagram of a method 300 for ingestion is shown. In some examples, at step 302, the method 300 can include source validation. For example, the data processing system can validate ingested source materials 308 by confirming file integrity, format, and compliance with expected content requirements. In some implementations, source validation can include parsing a source file to identify or parse sections, tables, figures, or other content into elements (e.g., JSON objects 310) configured for downstream processing. In some examples, source validation can include a human-in-the-loop review where a subject matter expert inspects flagged content for quality, completeness, or relevance. The validated source content can then be output as structured data for subsequent tagging in step 304.

In some examples, at step 304, the method 300 can include source tagging. For example, the data processing system can apply one or more tagging rules to the validated source content 312 to associate each element with a corresponding guideline-based requirement. In some implementations, source tagging can include referencing an external set of templates or guideline documents (e.g., E3 guidelines 314) that define expected section structures, headings, or metadata. In some examples, the guidelines can be represented as structured data (e.g., JSON 316), and the data processing system can use the structured guideline representation to identify and assign tags to portions of the source content. For example, a section of a study protocol can be tagged with identifiers corresponding to "Study Design," "Participants," or "Ethical Conduct" in accordance with the E3 guideline structure. In some examples, tagging can further include assigning identifiers to tables, figures, and listings for downstream mapping to manuscript sections. In some implementations, tagging can be performed automatically or can include a human-in-the-loop review to confirm the correctness of assigned tags. The output of source tagging can include a structured representation (e.g., JSON 318) in which each section, table, or figure is associated with one or more guideline-based tags for subsequent operations.

In some examples, at step 306, the method 300 can include table and figure annotation. For example, the data processing system can generate structured annotations for tables and figures extracted during ingestion. In some implementations, table/figure annotation can include associating each table or figure with metadata such as an identifier, title, caption, source location, and one or more guideline-based tags generated during step 304. In some examples, the data processing system can further generate automated summaries or descriptive placeholders for each table or figure (e.g., a short narrative summary of the content of a figure or a structured list of variables included in a table) to support downstream prompt generation and output generation. In some examples, annotation can include linking a table or figure to relevant portions of the source materials 308 (e.g., sections of a study protocol or statistical analysis plan) such that references to the table or figure in the generated manuscript can be verified against the underlying data. In some examples, table/figure annotation can include outputting a structured representation (e.g., JSON 320) that encodes each annotated table and figure such that the annotated items can be referenced during subsequent operations (e.g., payload extraction, prompt generation, validation, etc.).

Figure 4:
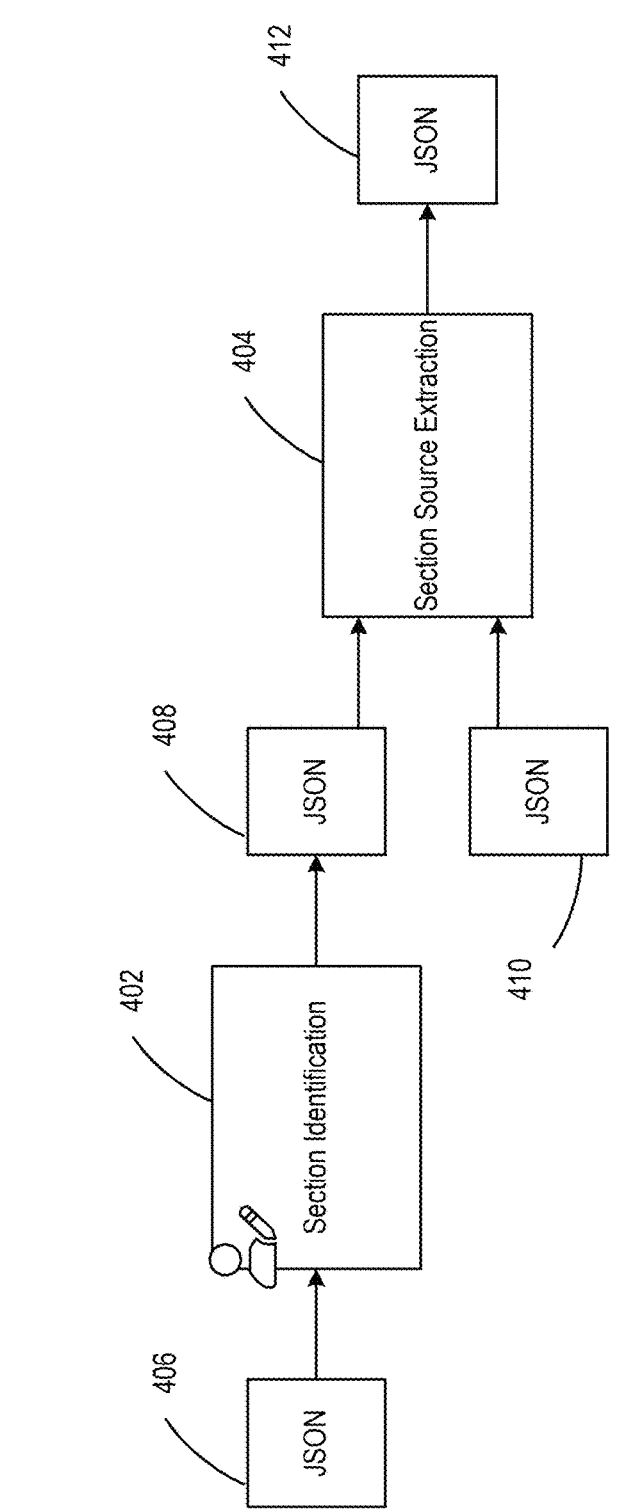
FIG. 4 illustrates an example flow diagram of a method for payload extraction, in accordance with one or more implementations.

Referring to FIG. 4, an example flow diagram of a method 400 for payload extraction is shown. In some examples, at step 402, the method 400 can include section identification. For example, the data processing system can identify sections or subsections of the output manuscript that are expected to be populated based on one or more templates or guidelines. In some implementations, section identification can include processing a table of contents (e.g., JSON 406) or other metadata from the ingested source materials to generate a list of section identifiers (e.g., JSON 408) that correspond to manuscript sections such as background, methods, results, or discussion. In some examples, section identification can be performed automatically by parsing source content and can include a human-in-the-loop review to confirm that relevant sections are identified for downstream extraction.

In some examples, at step 404, the method 400 can include section source extraction. For example, the data processing system can match the section identifiers generated in step 402 with resources from the ingested source materials (e.g., JSON 410) to generate a structured payload for each identified section. In some implementations, section source extraction can include using generative models (e.g., LLMs) to parse and link source text, tables, or figures to corresponding section identifiers, such that each payload is encoded as a JSON structure (e.g., JSON 412) representing relationships between input sources and output manuscript sections. In some examples, the method 400 can include ingesting volumes of input data (e.g., large volumes such a 20,000 pages or texts, or higher or lower volumes), identifying and extracting subsets of the input data (e.g., individual sections, combinations of sections, etc.), and mapping the subsets of the input data to intended output sections. For example, using subsets of input data can improve processing efficiency and reduce token usage (e.g., as opposed to use of raw source data or full data volumes), which can decrease resource consumption and improve system response times during input processing and/or output generation. In addition, using subsets of input data can improve the accuracy of generated outputs by targeting particular portions of input data that are relevant to generated outputs, thereby reducing model hallucinations and verifying the outputs match corresponding input content. In some examples, section source extraction can further include detecting missing or incomplete source content and generating a flag or placeholder entry in the payload to prompt for additional input or review. The section payloads generated in step 404 can then be used for prompt generation.

Figure 5:
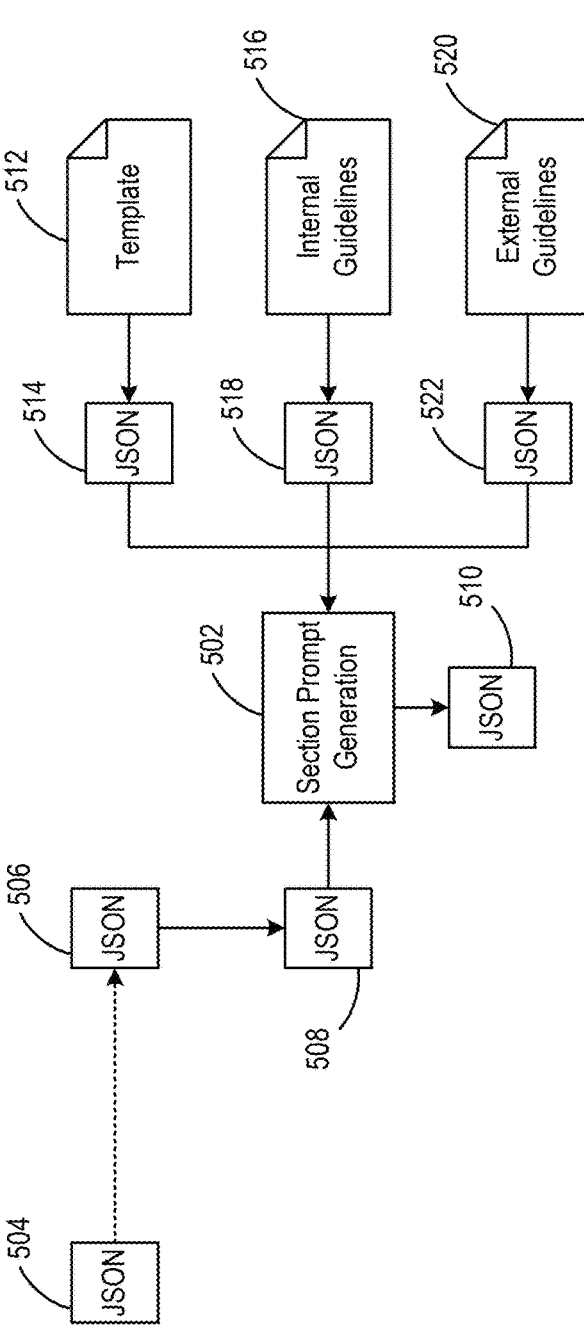
FIG. 5 illustrates an example flow diagram of a method for prompt generation, in accordance with one or more implementations.

Referring to FIG. 5, an example flow diagram of a method 500 for prompt generation is shown. In some examples, at step 502, the method 500 can include section prompt generation. For example, the data processing system can generate a section prompt (e.g., set of model input parameters) for a particular output section (e.g., title, background, methods, results, discussion, abstract, etc.) by identifying and processing JSON objects corresponding to various source materials or templates that correspond to the output section. For example, the data processing system can identify and process previous AI-generated sections (e.g., JSON 504), AI-generated source material (e.g., JSON 506), and section payloads (e.g., JSON 508) that correspond to each output section. In some examples, generating the section prompt can include identifying and processing a template 512 (e.g., JSON 514 representing a PRO template), internal guidelines 516 (e.g., JSON 518), and external guidelines 520 (e.g., JSON 522 representing CONSORT, PRO extension guidelines) that apply to multiple output sections. In some examples, the section prompt can be generated in a structured object or representation (e.g., JSON 510) that can then be used for section generation.

Figure 6:
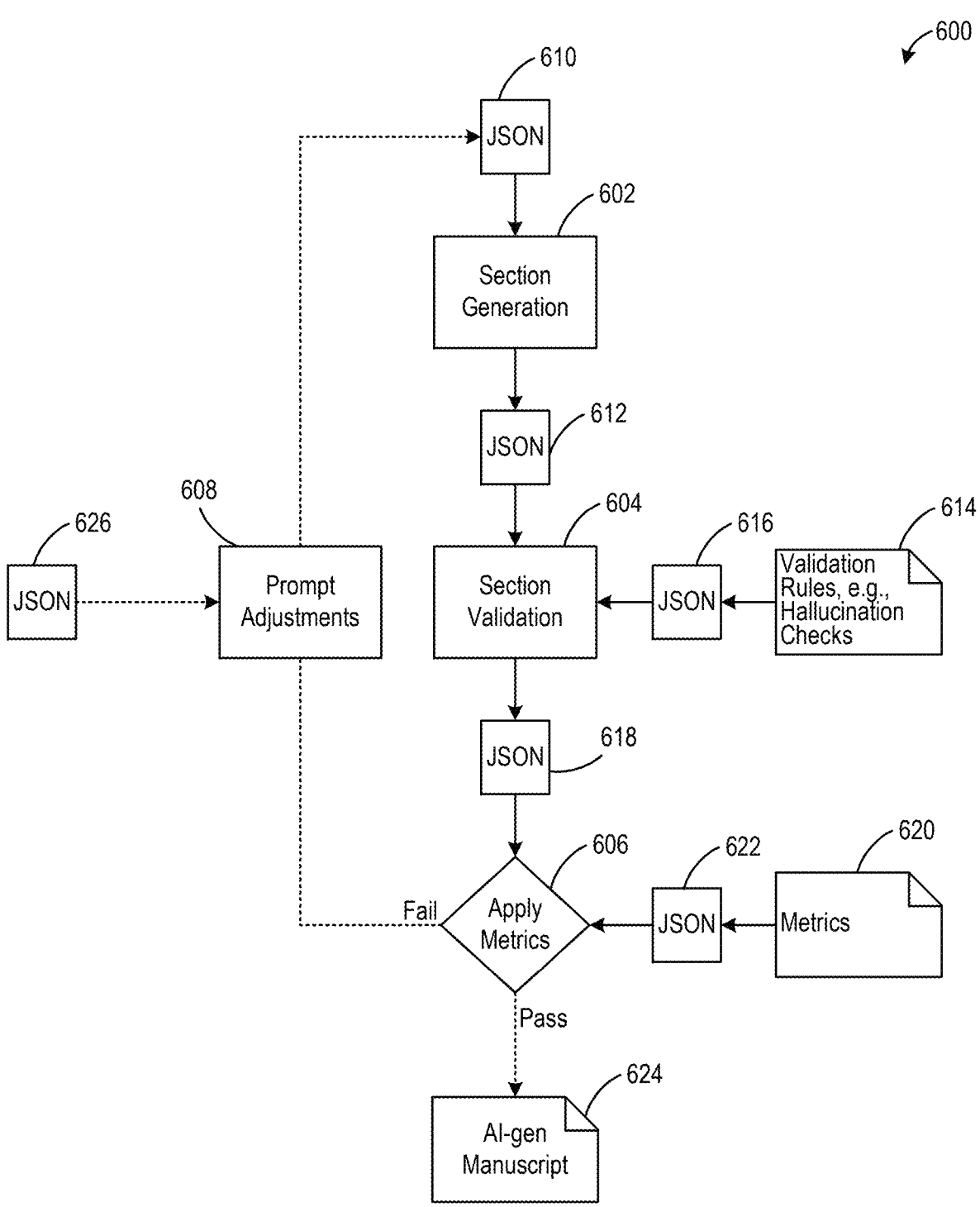
FIG. 6 illustrates an example flow diagram of a method for section generation, in accordance with one or more implementations.

Referring to FIG. 6, an example flow diagram of a method 600 for section generation is shown. In some examples, at step 602, the method 600 can include section generation. For example, the data processing system can provide a section prompt (e.g., JSON 610 generated in method 500) to one or more generative models to generate a draft section of manuscript content. In some examples, the generated output can be provided as a structured representation (e.g., JSON 612) that includes the generated content and associated metadata (e.g., output section identifier, linked source identifiers, prompt parameters, etc.). In some examples, at step 604, the method 600 can include section validation. For example, the data processing system can apply one or more validation rules 614 (e.g., JSON 616) to the generated section text to evaluate compliance with structural, coverage, or other parameters. In some implementations, section validation can include applying automated checks such as hallucination detection, traceability verification (e.g., confirming statements link to source identifiers), spelling and grammar checks, and style or formatting checks based on defined guidelines. In some examples, section validation can further include generating comments or flags (e.g., JSON 618) used to generate annotations (e.g., including linked identifiers, rationales or justifications, etc.) for the output section or to indicate that expected content to generate the output section is missing or unavailable.

In some examples, at step 606, the method 600 can include applying metrics. For example, the data processing system can compare the validated section text against a set of metrics 620 (e.g., JSON 622) derived from internal benchmarks or external guidelines (e.g., CONSORT, CONSORT-PRO). Applying metrics can include calculating coverage scores, compliance percentages, or quality measures, and comparing the calculated values against predefined thresholds. If the metrics satisfies the thresholds, the section can proceed to integration as part of the AI-generated manuscript 624. If the metrics fail to satisfy the thresholds, the method 600 can direct the section to step 608 for prompt adjustments and refinement. In some examples, at step 608, the method 600 can include prompt adjustments. For example, the data processing system can use feedback (e.g., JSON 626 including SME comments) to adjust the section prompt and regenerate the section content. In some implementations, prompt adjustments can include revising instructions, modifying model parameters, or expanding/restricting payload inputs. The adjusted prompt can then be re-provided to the generative models for section generation at step 602.

Figure 7:
FIG. 7 illustrates an example flow diagram of a method for review, in accordance with one or more implementations.
Figure 7:
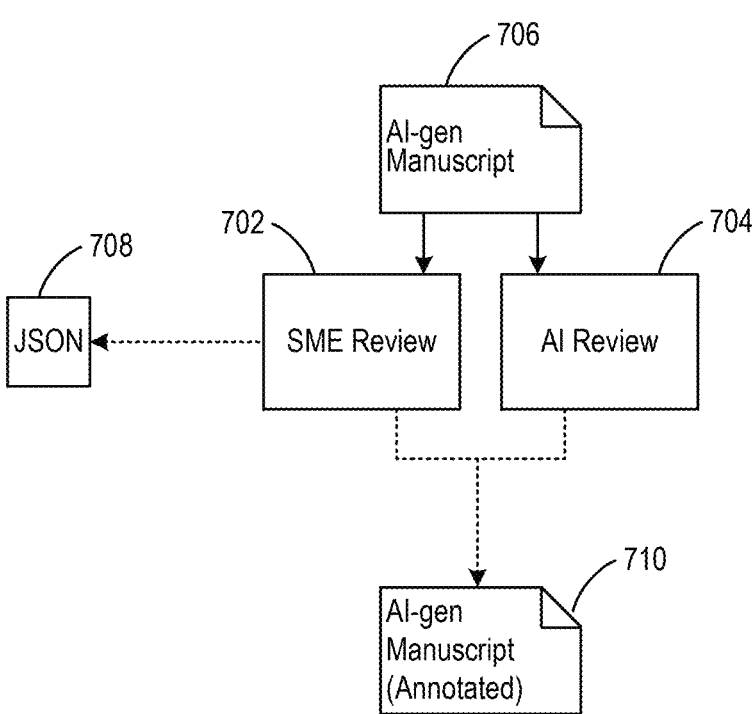

Referring to FIG. 7, an example flow diagram of a method 700 for review is shown. In some examples, at step 702, the method 700 can include subject matter expert (SME) review. For example, the data processing system can provide an AI-generated manuscript 706 to a review interface where an SME can annotate, edit, or comment on the draft manuscript (e.g., target object). In some implementations, SME review can include evaluating scientific accuracy, contextual completeness, and compliance with clinical or regulatory expectations. In some examples, SME comments or feedback can be stored as structured data (e.g., JSON 708) and linked to corresponding manuscript sections for downstream processing. In some examples, at step 704, the method 700 can include AI review. For example, the data processing system can apply an AI model to the AI-generated manuscript 706 to automatically generate annotations including links between generated statements and source identifiers, corresponding rationales or justifications, or flags indicating possible deficiencies (e.g., unsupported claims, ambiguous terminology, etc.). In some examples, the AI review can include performing reference checks, compliance checks, hallucination checks, clean-up operations, or other verification or refinement procedures to improve the accuracy of quality of the AI-generated manuscript 706. In some examples, outputs from the SME review or AI review can be incorporated with the AI-generated manuscript 706 to generate an annotated AI-generated manuscript 710 for finalization or distribution (e.g., to provide to a customer).

Figure 8:
FIG. 8 illustrates an example flow diagram of a method for benchmarking, in accordance with one or more implementations.
Figure 8:
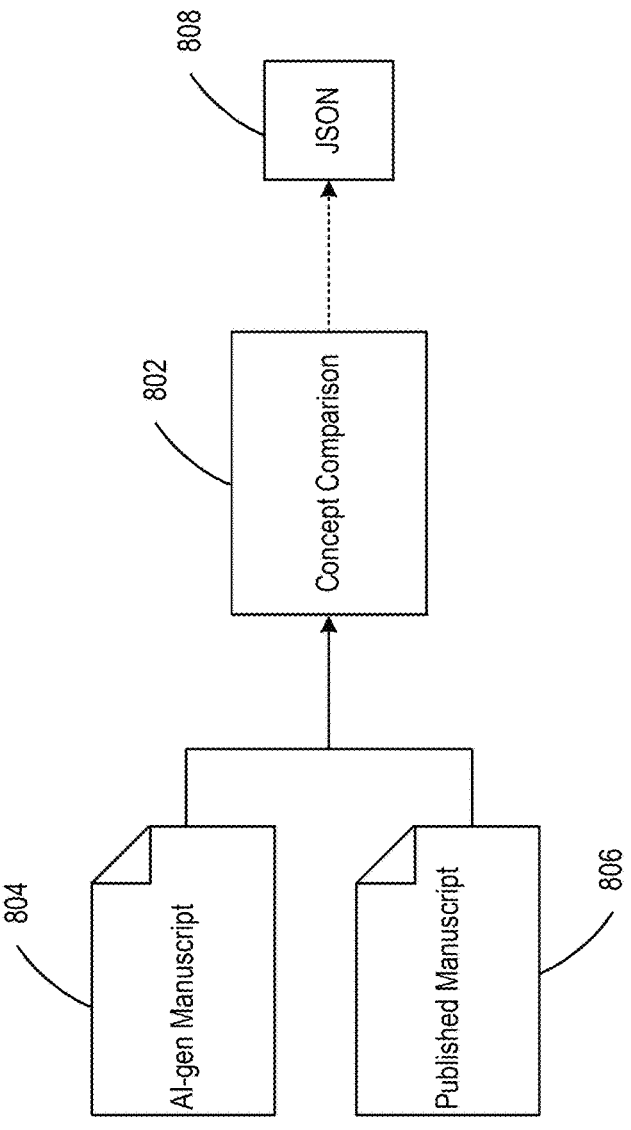

Referring to FIG. 8, an example flow diagram of a method 800 for benchmarking is shown. In some examples, at step 802, the method 800 can include concept comparison. For example, the data processing system can receive an AI-generated manuscript 804 and at least one published manuscript 806, and compare respective content representations of each manuscript to generate benchmark data. In some implementations, concept comparison can include transforming the manuscripts into structured feature sets (e.g., JSON 808) that capture concepts, entities, relationships, or semantic patterns. For example, concept comparison can include calculating overlap scores, coverage percentages, or similarity metrics between the AI-generated manuscript 804 and one or more published manuscripts 806. For example, concept comparison can identify whether expected topics (e.g., study design, outcomes, statistical methods, or patient-reported results) are present in the AI-generated draft and align with corresponding sections of the published manuscripts. In some implementations, benchmarking can further include producing a comparative visualization (e.g., Venn diagram or similarity map) to highlight areas of convergence and divergence. In some examples, the benchmark data (e.g., JSON 808) can be stored for downstream use in quality scoring, prompt adjustment, or compliance reporting. For example, the data processing system can compare overlap scores against a threshold (e.g., 90%) to determine whether the model is validated or whether additional adjustments are to be performed (e.g., modifying templates or prompt structures, including additional or different payload sources, etc.).

Figure 9:
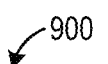
FIG. 9 illustrates an example flow diagram of a method for manuscript generation using large language models, in accordance with one or more implementations.
Figure 9:
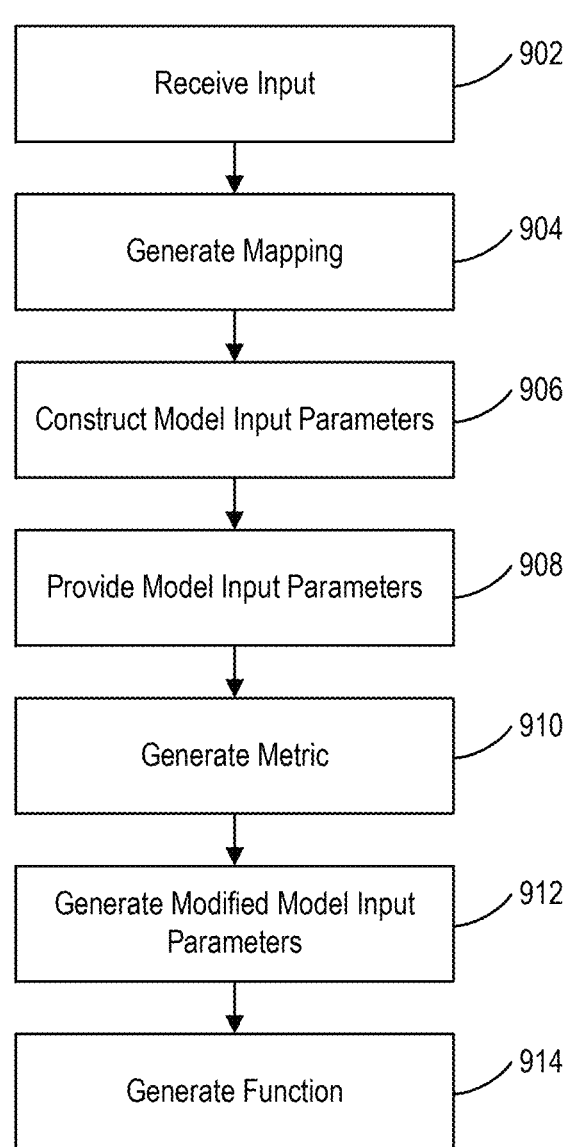

Referring to FIG. 9, an example flow diagram of a method 900 for manuscript generation using large language models is shown. In an overview, the method 900 can include receiving an input at step 902, generating a mapping at step 904, constructing model input parameters at step 906, providing model input parameters at step 908, generating at least one metric at step 910, generating modified model input parameters at step 912, and generating a function at step 914.

The method 900 can include receiving an input at step 902. In some examples, at step 902, one or more processors (e.g., a data processing system such as data processing system 110) can receive an input including at least one machine-readable data object including resources divided by one or more input node identifiers. Receiving can include ingesting source materials from one or more repositories or client devices and converting the source materials into a structured format that can be processed downstream. For example, receiving can include processing clinical study reports, study protocols, statistical analysis plans, published manuscripts, or other documents including text, tables, figures, or references into a structured object (e.g., JSON object) where each section, subsection, or item is associated with a corresponding input node identifier. In some examples, the input node identifiers can include section identifiers (e.g., "methods," "results," "discussion"), subsection identifiers (e.g., "study design," "patient population"), or identifiers for discrete resources such as "table 1," "FIG. 2," or "reference 14." In some examples, receiving can include validating that each input node identifier is properly linked to a resource and that the resource is formatted for compatibility with subsequent mapping operations. In some examples, receiving can include tagging the machine-readable data object with input node identifiers that represent discrete sections, subsections, or other resources included in the source document. In some implementations, receiving can including identifying that source materials have been uploaded into an upload folder of an application or that a manuscript generation command or request has been received (e.g., via an interface of the application).

The method 900 can include generating a mapping at step 904. In some examples, at step 904, the one or more processors can generate a multi-level resource mapping that encodes associations between the one or more input node identifiers and one or more output node identifiers. For example, the mapping can specify how sections or subsections of the source materials correspond to sections or subsections of a target manuscript (e.g., "table 1" in a statistical analysis plan linked to "results" in an output manuscript, etc.). In some implementations, generating the mapping can include parsing structural data or metadata such as a table of contents, section headers, figure labels, or reference lists from the source materials and aligning such data with a predefined (e.g., based on CONSORT-PRO guidelines) or dynamically generated manuscript template. In some examples, the multi-level resource mapping can include nested associations that capture multiple layers of relationships between input node identifiers and output node identifiers. For example, an output node identifier corresponding to "study design and participants" can be associated with multiple input node identifiers such as "section 1.4 study design" from a study protocol, "section 5.3.1 clinical outcome assessments" from the same protocol, and "FIG. 1 study design" from a clinical study report. In some implementations, generating the mapping can further include identifying redundant, missing, or conflicting associations and applying rule-based or machine learning-based resolution logic to refine the mapping. In some examples, the mapping can be represented in a structured object (e.g., JSON, XML, or graph structure) that encodes the associations between input node identifiers and output node identifiers and preserves references to the underlying resources. In some implementations, generating the mapping can further include supporting human-in-the-loop review to confirm correctness or to add or delete encoded associations.

The method 900 can include constructing model input parameters at step 906. In some examples, at step 906, the one or more processors can construct, for each of the one or more output node identifiers, a set of model input parameters. Each set of model input parameters can be based on a selection of at least a portion of the resources from the at least one machine-readable data object, and the selection can be based on an association with one or more corresponding input node identifiers encoded by the multi-level resource mapping. For example, constructing can include identifying input node identifiers associated with a particular output section (e.g., represented by an output node identifier) and including the resources or references to the resources represented by the input node identifiers within a generative AI model prompt. In some examples, constructing can include combining the selected resources with instructions or constraints that correspond to the output section or output manuscript, such as target-specific parameters (e.g., tone, style, or content corresponding a particular journal, publisher, or other audience for the output manuscript), global instructions (e.g., requirements that apply to all output sections, such as citation formatting, acronym expansion, or threshold targets) and section-specific instructions (e.g., figure and table suggestions are to be included in the results section, the discussion section is to be a bulleted list of discussion points rather than prose, the references section is to include a separate .RIS file (or other file format that is compatible with reference management software), etc.). In some implementations, constructing can further include tagging each set of model input parameters with metadata linking to corresponding input node identifiers and output node identifiers such that downstream generation preserves traceability between the constructed parameters and the resources from which they were derived.

The method 900 can include providing model input parameters at step 908. In some examples, at step 908, the one or more processors can provide each set of model input parameters to a first generative model to generate an output data object for each of the one or more output node identifiers. Providing can include transmitting, prompting, or otherwise supplying the constructed parameters to a generative AI model through a call, request, or interface. For example, providing can include packaging the selected resources and instructions from step 906 into a structured prompt and transmitting the prompt to a model endpoint accessible through an application programming interface (API). In some implementations, providing can further include supplying additional parameters that control model execution (e.g., token limits, beam width, temperature settings, or other generation controls). In some examples, providing can include directing the generative model to generate textual output (e.g., a draft of a "methods" section), graphical output (e.g., a figure, caption, or placeholder), or other structured output in accordance with the set of model input parameters.

The method 900 can include generating at least one metric at step 910. In some examples, at step 910, the one or more processors can generate at least one metric for each output data object, and the at least one metric can be based on a comparison of the output data object to a corresponding structural or coverage parameter. Generating a metric can include evaluating or comparing the output data object against predefined or dynamic target thresholds for structure (e.g., whether the output includes expected subsections, tables, figures, or references), coverage (e.g., whether the output includes content from each of the corresponding input node identifiers), accuracy (e.g., whether the output avoids hallucinations), refinement (e.g., whether proper tone or style are used), or other attributes. For example, generating can include comparing the content of an output "methods" section to structural parameters that indicate inclusion of subsections such as "study design," "participants," and "statistical analyses" are expected, and producing a metric that reflects completeness of those subsections. In some examples, generating can further include comparing the coverage of an output "results" section to expected content linked from the source materials, such as tables or figures, and producing a metric that reflects whether each linked input node identifier is addressed in the generated text. In some implementations, the metrics can be quantitative (e.g., a numeric score indicating a degree of alignment) or qualitative (e.g., a binary indicator representing a pass or fail for a given metric).

The method 900 can include generating modified model input parameters at step 912. For example, in response to the at least one metric failing to satisfy the corresponding structural or coverage parameter, the one or more processors can automatically generate a modified set of model input parameters to regenerate the output data object. Generating modified model input parameters can include altering the previously constructed parameters such that a regenerated output data object better aligns with expected targets. For example, generating modified model input parameters can include adjusting the model instructions or constraints included in the LLM prompt or modifying input node identifiers included or referenced in the prompt. In some implementations, the modifications can include broadening the scope of selected resources (e.g., adding subsections of a study protocol that were initially excluded), narrowing the scope (e.g., removing redundant passages that caused style or coverage errors), or changing guidance for output generation (e.g., refining formatting rules, updating tone or style directives, adjusting accuracy requirements, prompting or selecting different models, etc.). In some implementations, generating modified model input parameters can include incorporating metadata produced during metric evaluation (e.g., flags indicating missing content or references) such that the regenerated output data object addresses deficiencies identified during metric comparison. In some examples, the one or more processors can provide the updated or modified set of model input parameters to the generative models to cause the generative models to regenerate the output content. In some examples, generating can include iteratively generating metrics for regenerated output data objects and re-modifying sets of model input parameters based on the generated metrics until the metrics satisfy the corresponding structural or coverage parameters.

The method 900 can include generating a function at step 914. In some examples, at step 914, the one or more processors can generate, based on a schema of a word processing application, a function that causes the word processing application to create an annotation for each output data object. For example, generating the function can include identifying, using a second generative model, a textual or graphical representation presented in a first region of a graphical user interface of the word processing application for each output data object. For example, generating the function can include populating a body of the annotation with an indicator linking each textual or graphical representation to at least one of the one or more input node identifiers, and the annotation can be configured to be presented in a second region of the graphical user interface of the word processing application. For example, a function can include an executable instruction set (e.g., coded as a Python script) that the word-processing application accepts to create and bind annotations to document content in accordance with a document model (e.g., schema) of the application (e.g., Office Open XML for DOCX, OpenDocument for ODT, or an editor's JSON/JS document model). An annotation can include a comment/note object stored in the document model that is rendered in a second region of the UI (e.g., margin or side panel) while being anchored to a textual or graphical representation in a first region (e.g., the editable canvas with paragraphs, runs, table cells, figures, shapes, etc.) such that an interaction with the second region of the UI (e.g., selecting a particular comment) causes an adjustment to the first region (e.g., causes the canvas to navigate to or highlight the corresponding text or graphic), and an interaction with the first region (e.g., selecting a phrase corresponding to a comment) causes an adjustment to the second region (e.g., causes the margin or side panel to navigate to or emphasize the corresponding comment). An indicator can include structured data persisted in the annotation body that links the anchored content back to at least one input node identifier to provide source provenance for the generated output data object.

In some examples, generating the function can include (i) identifying the anchor by using a second generative model to emit a selection for each output data object (e.g., paragraph/run offsets for text, table coordinates for cells, object IDs for figures/captions), (ii) verifying the annotation container exists per schema (e.g., creating or opening the comments part/collection); (iii) creating the annotation object with required fields (identifier, author/source, timestamp) and binding the object to the anchor using schema-defined range markers or object references, and (iv) populating the annotation body with the indicator that links to one or more input node identifiers and addition information (e.g., rationales or justifications, references, figure explanations, etc.). The anchor specification can be normalized (e.g., by specifying a {targetType, selector, range}) such that function can target different word-processing schemas while producing similar bindings. In some examples, the function causes the word-processing application to render the annotation in the second region automatically once the schema-conformant nodes/objects are inserted and bound. Because the annotation body includes the indicator (e.g., a list of input node identifiers and optional stable URIs into the ingested object store), reviewers can traverse from the highlighted first-region content to its sources without leaving the editing environment.

In some examples, the method 900 can include associating, by the one or more processors, the annotation with a portion of the output data object presented in the first region of the graphical user interface of the word processing application. Associating can include binding the annotation to a span of text or a graphical object by inserting schema-defined anchors or references that identify the specific location of the output data object within the document model. For example, associating can include inserting start and end markers around a run of text, attaching a comment reference to a figure caption, or linking to a table cell coordinate presented in the first region of the word processing application. In some implementations, associating can further include normalizing the reference into a structured descriptor (e.g., paragraph index, run offsets, or object identifier) that unambiguously identifies the portion of the output data object that is to be annotated.

In some examples, the method 900 can include providing, by the one or more processors, the annotation for presentation in the second region of the graphical user interface of the word processing application responsive at least in part to selection of the portion of the output data object. Providing can include rendering the annotation in a comment pane, margin view, or sidebar while the linked portion of the output data object is highlighted in the first region. For example, providing can include configuring the annotation such that when a user selects or hovers over the associated text, table, or figure, the annotation body is displayed in the second region together with the indicator linking back to input node identifiers. In some implementations, providing can further include storing the annotation in the document model such that the annotation remains persistently available and is re-presented whenever the corresponding portion of the output data object is selected in the first region of the graphical user interface.

In some examples, each of the one or more input node identifiers corresponds with a location of the resources within the at least one machine-readable data object. For example, the input node identifiers can correspond to section identifiers (e.g., "methods," "results"), subsection identifiers (e.g., "study design," "patient population"), or labels for discrete resources (e.g., "table 1," "FIG. 2," "reference 14"). Associating each input node identifier with such a location provides a direct reference from the ingested resource to the generated output. In some examples, the indicator presents the location of the resources on the word processing application via the annotation. For example, the annotation body can include the section identifier or figure number as part of the comment text, such that when a reviewer selects or views the annotation in the second region of the graphical user interface, the displayed indicator shows the original location of the resource and links the generated content back to its source location in a manner that is transparent and easily reviewable within the editing environment.

In some examples, the method 900 can include determining, by the one or more processors, a structure and one or more fields of the function based on the schema of the word processing application. Determining can include parsing or referencing the document model of the application to identify how annotations are represented within the word processing application framework. For example, the structure of the function can include a container element (e.g., a w: comment element in a DOCX schema or an office: annotation element in an ODT schema) and fields such as identifiers, author information, date fields, and body text. In some implementations, determining can further include mapping generic function fields (e.g., annotationId, author, body, link) to the corresponding fields expected by the application schema such that the function produces schema-compliant annotations when executed.

In some examples, the method 900 can include populating, by the one or more processors, based on the structure, the one or more fields of the function with metadata. The metadata can include at least the indicator and a source identifier associated with the second generative model. For example, populating can include filling the fields of the function with information the causes the word processing application to generate, based on execution of the function, an annotation body with the indicator that links the annotation to one or more input node identifiers and the source identifier that identifies an author of the annotation content. For example, populating can include setting or assigning values included in the function to represent the corresponding input node identifiers (e.g., "5.3.1 Clinical Outcome Assessments," "Table 2 Schedule of assessments for all immunotherapy arms treatment period," etc.) and the source identifier (e.g., "AI author").

In some examples, the method 900 can include executing, by the one or more processors, via an application programming interface (API) of the word processing application, the function to cause the word processing application to create the annotation attributed to the source identifier. Executing can include transmitting the structured function or script to the word processing application using the application's API, such as Open XML SDK calls for DOCX, UNO API calls for ODT, or JSON-based editor APIs. For example, executing can include invoking a comment-insertion API with parameters corresponding to the annotation structure and populated metadata, causing the word processing application to insert the annotation into its document model. In some implementations, the created annotation can attributed to the source identifier (e.g., tagged with the name or ID of an author) and include resource locations from corresponding source materials (e.g., input node identifies) such that downstream reviewers or validators can identify the origin of the annotation and its linkage to the underlying resources.

In some examples, the method 900 can include generating, by the one or more processors, a target object by aggregating the textual or graphical representation for each output data object based on the multi-level resource mapping and at least one set of (i) accuracy parameters, (ii) content and completeness parameters, (iii) style parameters, or (iv) refinements. For example, a target object refers to the composite document structure that combines all generated sections, tables, figures, and references into a single representation or output. Aggregating can include ordering the output data objects according to the multi-level resource mapping (e.g., placing a "methods" output section before a "results" output section, inserting figure captions in their mapped locations, etc.) and applying evaluation parameters to guide or validate the aggregated output. For example, generating the target object can include applying one or more parameters to verify scientific accuracy, content and completeness, polishing and professionalism, and/or refinements (e.g., which may or may not be applied to first-draft manuscript outputs).

In some examples, the method 900 can include causing, by the one or more processors, the word processing application to present the target object on a client device. For example, causing presentation can include causing the word processing application to render and display the target object on a GUI for review or editing. For example, causing can include loading the aggregated target object into the word processing application by invoking an application programming interface (API) or by writing the target object into a document format (e.g., DOCX or ODT) that the application natively renders. For example, the one or more processors can generate a DOCX package including the aggregated content and annotations and instruct the word processing application to open the package on the client device. In some implementations, causing presentation can include updating an active editing session such that the target object appears within the first region of the user interface, with associated annotations displayed in the second region for reviewer interaction.

In some examples, the set of model input parameters can include the selection of resources associated with a corresponding output node identifier, one or more target-specific parameters, and instructions to cause the first generative model to generate the output data object based on the selection of resources and the one or more target-specific parameters. The selection of resources can refer to the portions of the machine-readable data object or references to the portions that are linked to the output node identifier by the multi-level resource mapping. For example, if the output node identifier corresponds to "Methods," the selection can include the text spans, table references, or figure numbers mapped to that section. The target-specific parameters can refer to constraints applied to tune or target the output to particular expectations or requirements for an intended journal. For example, the target-specific parameters can include formatting rules (e.g., numbered headings, citation formatting), tone parameters (e.g., expected voice or writing style), or content rules (e.g., expected manuscript sections and subsections). The instructions can refer to directives supplied to the generative model that define how to process the selected resources and parameters. For example, the instructions can specify to compose prose paragraphs from the mapped subsections, to insert figure numbers as cross-references, or to format references according to the target-specific style. In some examples, the set of model input parameters can be represented as a structured object or prompt that packages together (i) the identifiers of the selected resources, (ii) the target-specific parameters for generation, and (iii) the instructions that the generative model uses to produce the corresponding output data object.

In some examples, the method 900 can include providing, by the one or more processors, the modified set of model input parameters to the first generative model. Providing can include transmitting the modified parameters as input to the generative model as described regarding the original set of model input parameters. In some examples, the modified set of model input parameters can include updated resource identifiers, adjusted target-specific parameters, and revised instructions such that the generative model regenerates content with corrections applied. In some examples, the method 900 can include receiving, by the one or more processors, a regenerated output data object. Receiving can include capturing the response returned by the generative model after execution with the modified input parameters. For example, the regenerated output data object can be a revised section of text, a corrected table caption or figure description, or another portion of updated content that reflects the applied modifications. In some examples, the method 900 can include updating, by the one or more processors, the at least one metric based on a comparison of the regenerated output data object to the corresponding structural or coverage parameter. Updating can include recalculating or re-comparing completeness, accuracy, style, or refinement metrics using the thresholds defined for the original output data object and recording whether the regenerated output satisfies those thresholds. For example, updating can include verifying that a regenerated "Results" section now contains expected tables or that a corrected "Methods" section includes correct numerical values or removes hallucinations.

In some examples, the method 900 can include causing, by the one or more processors, a client device to present at least one input element configured to receive the input including the at least one machine-readable data object. Causing can include the one or more processors providing data that causes the client device to render a graphical element or provide a programmatic interface through which the machine-readable data object is provided. In some examples, the input element can include a file upload control (e.g., input button or upload folder), a form field, or an application programming interface endpoint (e.g., a file selector dialog, a drag-and-drop region, or an API call returning JSON). For example, the one or more processors can receive source materials for ingestion in response to an input using the at least one input element. In some examples, the method 900 can include tagging, by the one or more processors, the at least one machine-readable data object with the one or more input node identifiers. Tagging can include assigning identifiers to portions of the machine-readable data object such that each portion can be referenced during subsequent processing. In some examples, the input node identifiers can correspond to structural divisions or labels (e.g., section identifiers, subsection identifiers, figure numbers, or table numbers) of source materials. For example, the one or more processors can tag the source materials using identifiers by scanning the machine-readable data object (e.g., manually, using AI models, using parsing rules, etc.), detecting boundaries such as sections, subsections, tables, or figures, and then attaching an identifier to each boundary.

In some examples, the method 900 can include causing, by the one or more processors, the word processing application to present, within each annotation associated with a graphical representation, at least one graphical type for generation of a graphical object associated with the graphical representation. For example, a graphical type can refer to a particular format or structure used for data visualization, such as a forest plot, bar chart, line chart, or flow diagram. For example, causing can include embedding, in the annotation, both a reference to the source data used to support inclusion of graphical content and a recommendation of the graphical type to be used for display of the graphical content. In some examples, the graphical type can be identified based on proprietary logic or guideline-based rules (e.g., predefined logic, CONSORT-PRO guidelines for data visualizations, etc.).

In some examples, the method 900 can include causing, by the one or more processors, a client device to present at least one input element associated with the multi-level resource mapping. Causing can include providing data to the client device such that the client devices display or updates a graphical user interface to include at least one control (e.g., selectable button, text box, etc.) linked to the associations defined in the multi-level resource mapping. For example, the input element can include a table showing input node identifiers aligned with output node identifiers, a drag-and-drop interface, an editable mapping field, or a confirmation/approval button. In some examples, the method 900 can include receiving, by the one or more processors, via the at least one input element, at least one of a confirmation or adjustment to the associations between the one or more input node identifiers and the one or more output node identifiers encoded by the multi-level resource mapping. Receiving can include capturing user input or interaction signals that verify the correctness of existing associations or propose modifications or adjustments. For example, the confirmation or adjustments can confirm that mapped links are accurate or can change how particular resources are linked for output generation (e.g., confirming that "Methods" content from source materials maps to a "Methods" section of an output manuscript, re-assigning a table to a "Results" section, removing an extraneous figure link, etc.).

In some examples, at least one of (i) the presentation of the input element or (ii) the confirmation or adjustment to the associations between the one or more input node identifiers and the one or more output node identifiers is based on one or more regulatory-specific or industry-specific parameters. For example, the regulatory-specific or industry-specific parameters can define rules that the one or more processors apply when displaying the mapping for review or when evaluating a confirmation or adjustment received through the input element. In some examples, the regulatory-specific or industry-specific parameters can reflect submission or reporting frameworks (e.g., CONSORT-PRO guidelines, ICH E3 structure, or journal-specific templates) and can constrain how mappings are shown and validated. For example, the one or more processors can highlight expected associations when presenting the input element, restrict adjustments that would remove a mandated section or figure, or automatically confirm an association when it aligns with a regulatory template to verify that the generated mapping conforms to the relevant regulatory-specific or industry-specific guidelines.

In some examples, at least one annotation includes a flag indicating that resources corresponding to an input node identifier are missing from the at least one machine-readable data object. For example, the flag can represent a condition where the mapping identifies an input node identifier but no corresponding resource is detected in the ingested material, or the mapping fails to include an input node identifier for one or more output sections. In some examples, the flag can be encoded within the annotation and displayed in the word processing application as part of the comment text or as a marker linked to the output content (e.g., a note stating "missing source," a placeholder icon, a warning message, etc.). In some examples, the flag can be used as an input to validation or review workflows, to prompt a user to supply the missing resource, or to prevent finalization of the output until the missing association is resolved.

In some examples, the method 900 can include providing, by the one or more processors, an audit log including a plurality of immutable timestamps generated based on a plurality of operations associated with generation of each output data object. For example, the audit log can record the sequence of operations performed during processing and can store corresponding timestamps in a format that prevents modification after creation. In some examples, the operations can include ingesting source content, extracting payloads, tagging resources, constructing model input parameters, generating output data objects, applying validation rules, generating annotations, or additional operations. For example, the one or more processors can create a log entry when a resource is tagged, when a prompt is generated, when an output section is generated, when a missing-resource flag is applied, and so on. For example, the processors can maintain an immutable record that shows when each step or stage of a process for manuscript generation is completed for a given output data object to facilitate traceability and compliance review.

In some examples, the method 900 can include providing, by the one or more processors, within the annotation generated for each output data object, a rationale supporting association of a corresponding input node identifier with the output data object. For example, the rationale can be presented in the comment text of the annotation and can describe the reasoning for the mapping or the basis for the content included in the output data object. In some examples, the rationale can include auto-generated explanations derived from the mapping logic or validation rules (e.g., noting that a CONSORT diagram is required to show patient disposition, identifying a table as the source for baseline demographics, or indicating that a figure was linked according to a reporting guideline). The rationale can provide reviewers with additional context regarding how a particular output was generated or validated or be used during review/validation stages to verify that included output align with source materials. For example, the rationale can further support traceability and compliance by documenting decision-making steps within the annotation framework. In some examples, providing the rationale can include generating a recommendation for improving the output (e.g., suggested content changes, wording alterations, etc.) and a score or metric associated with the output (e.g., a categorical score such as "exemplary," "meets standard," "needs improvement," "fails," a numerical score such as 1-10, a percentage score, etc.). For example, the score can be generated by a generative model (e.g., LLM) and can provide an indicator that helps a reviewer to focus on aspects of the generated manuscript for adjustments or changes.

In some examples, the method 900 can include automatically generating and validating, by the one or more processors, one or more citations associated with at least one of (i) the annotation for each output data object, (ii) each output data object, or (iii) a reference list for a target object including each output data object. For example, the citations can be generated by extracting bibliographic data from the machine-readable data objects and formatting the extracted data according to regulatory or industry-specific requirements (e.g., ICMJE guidelines, PubMed metadata standards, or journal submission templates). In some examples, validation can include confirming the accuracy of identifiers and metadata, checking completeness of required fields, or verifying consistency with the linked input node identifiers. In some examples, the citations can be provided in one or more contexts or formats, such as embedded within the annotation as comment text, appended directly to the output data object, or aggregated into a consolidated reference list for the target object.

In some examples, the method 900 can include generating, by the one or more processors, based on each output data object included in a target object, a visual representation of the resources associated with the one or more input node identifiers at a plurality of processing stages. For example, the visual representation can depict how input resources are linked, transformed, and validated as they progress through the various processing stages (e.g., ingestion stages, mapping stages, generation stages, annotation stages, etc.). In some examples, the visual representation can include diagrams, flow charts, or schematic figures (e.g., a PRISMA diagram showing the inclusion and exclusion of resources, a flow diagram showing the transformation of input nodes into output sections, a timeline showing validation events, etc.). In some examples, the visual representation can provide reviewers with an overview of resource provenance and highlight how different resources contributed to the final target object. For example, the visual representation can support transparency, compliance, and auditability by documenting the evolution of content across the plurality of processing stages.

Referring now to FIG. 10, depicted is a block diagram 1000 depicting implementations of computing devices useful in connection with the methods and systems described herein.

Various operations described herein can be implemented on computer systems. FIG. 10 shows a simplified block diagram of a representative server system 1000, client computer system 1014, and network 1026 usable to implement certain implementations of the present disclosure. In various implementations, server system 1000 or similar systems can implement services or servers described herein or portions thereof. Client computer system 1014 or similar systems can implement clients described herein. The system 1000 described herein can be similar to the server system 1000. Server system 1000 can have a modular design that incorporates a number of modules 1002 (e.g., blades in a blade server implementation); while two modules 1002 are shown, any number can be provided. Each module 1002 can include processing unit(s) 1004 and local storage 1006.

Processing unit(s) 1004 can include a single processor, which can have one or more cores, or multiple processors. In some implementations, processing unit(s) 1004 can include a general-purpose primary processor as well as one or more special-purpose co-processors such as graphics processors, digital signal processors, or the like. In some implementations, some or all processing units 1004 can be implemented using customized circuits, such as application specific integrated circuits (ASICs) or field programmable gate arrays (FPGAs). In some implementations, such integrated circuits execute instructions that are stored on the circuit itself. In other implementations, processing unit(s) 1004 can execute instructions stored in local storage 1006. Any type of processors in any combination can be included in processing unit(s) 1004.

Local storage 1006 can include volatile storage media (e.g., DRAM, SRAM, SDRAM, or the like) and/or non-volatile storage media (e.g., magnetic or optical disk, flash memory, or the like). Storage media incorporated in local storage 1006 can be fixed, removable, or upgradeable as desired. Local storage 1006 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 1004 need at runtime. The ROM can store static data and instructions that are used by processing unit(s) 1004. The permanent storage device can be a non-volatile read-and-write memory device that can store instructions and data even when module 1002 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some implementations, local storage 1006 can store one or more software programs to be executed by processing unit(s) 1004, such as an operating system and/or programs implementing various server functions such as functions of the system 1000 or any other system described herein, or any other server(s) associated with system 1000 or any other system described herein.

"Software" refers generally to sequences of instructions that, when executed by processing unit(s) 1004, cause server system 1000 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 1004. Software can be implemented as a single program or a collection of separate programs or program modules that interact as desired. From local storage 1006 (or non-local storage described below), processing unit(s) 1004 can retrieve program instructions to execute and data to process in order to execute various operations described above.

In some server systems 1000, multiple modules 1002 can be interconnected via a bus or other interconnect 1008, forming a local area network that supports communication between modules 1002 and other components of server system 1000. Interconnect 1008 can be implemented using various technologies, including server racks, hubs, routers, etc.

A wide area network (WAN) interface 1010 can provide data communication capability between the local area network (e.g., through the interconnect 1008) and the network 1026, such as the Internet. Other technologies can be used to communicatively couple the server system with the network 1026, including wired (e.g., Ethernet, IEEE 802.3 standards) and/or wireless technologies (e.g., Wi-Fi, IEEE 802.11 standards).

In some implementations, local storage 1006 is intended to provide working memory for processing unit(s) 1004, providing fast access to programs and/or data to be processed while reducing traffic on interconnect 1008. Storage for larger quantities of data can be provided on the local area network by one or more mass storage subsystems 1012 that can be connected to interconnect 1008. Mass storage subsystem 1012 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 1012. In some implementations, additional data storage resources may be accessible via WAN interface 1010.

Server system 1000 can operate in response to requests received via WAN interface 1010. For example, one of modules 1002 can implement a supervisory function and assign discrete tasks to other modules 1002 in response to received requests. Work allocation techniques can be used. As requests are processed, results can be returned to the requester via WAN interface 1010. Such operation can generally be automated. Further, in some implementations, WAN interface 1010 can connect multiple server systems 1000 to each other, providing scalable systems capable of managing high volumes of activity. Other techniques for managing server systems and server farms (collections of server systems that cooperate) can be used, including dynamic resource allocation and reallocation.

Server system 1000 can interact with various user-owned or user-operated devices via a wide-area network such as the Internet. An example of a user-operated device is shown in FIG. 10 as client computing system 1014. Client computing system 1014 can be implemented, for example, as a consumer device such as a smartphone, other mobile phone, tablet computer, wearable computing device (e.g., smart watch, eyeglasses), desktop computer, laptop computer, and so on.

For example, client computing system 1014 can communicate via WAN interface 1010. Client computing system 1014 can include computer components such as processing unit(s) 1016, storage device 1018, network interface 1020, user input device 1022, and user output device 1024. Client computing system 1014 can be a computing device implemented in a variety of form factors, such as a desktop computer, laptop computer, tablet computer, smartphone, other mobile computing device, wearable computing device, or the like.

Processing unit 1016 and storage device 1018 can be similar to processing unit(s) 1004 and local storage 1006 described above. Suitable devices can be selected based on the demands to be placed on client computing system 1014. For example, client computing system 1014 can be implemented as a "thin" client with limited processing capability or as a high-powered computing device. Client computing system 1014 can be provisioned with program code executable by processing unit(s) 1016 to enable various interactions with server system 1000.

Network interface 1020 can provide a connection to the network 1026, such as a wide area network (e.g., the Internet) to which WAN interface 1010 of server system 1000 is also connected. In various implementations, network interface 1020 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 1022 can include any device (or devices) via which a user can provide signals to client computing system 1014; client computing system 1014 can interpret the signals as indicative of particular user requests or information. In various implementations, user input device 1022 can include any or all of a keyboard, touch pad, touch screen, mouse or other pointing device, scroll wheel, click wheel, dial, button, switch, keypad, microphone, and so on.

User output device 1024 can include any device via which client computing system 1014 can provide information to a user. For example, user output device 1024 can include display-to-display images generated by or delivered to client computing system 1014. The display can incorporate various image generation technologies, e.g., a liquid crystal display (LCD), light-emitting diode (LED) display including organic light-emitting diodes (OLED), projection system, cathode ray tube (CRT), or the like, together with supporting electronics (e.g., digital-to-analog or analog-to-digital converters, signal processors, or the like). Some implementations can include a device such as a touchscreen that function as both input and output device. In some implementations, other user output devices 1024 can be provided in addition to or instead of a display. Examples include indicator lights, speakers, tactile "display" devices, printers, and so on.

Some implementations include electronic components, such as microprocessors, storage, and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1004 and 1016 can provide various functionality for server system 1000 and client computing system 1014, including any of the functionality described herein as being performed by a server or client, or other functionality.

It will be appreciated that server system 1000 and client computing system 1014 are illustrative and that variations and modifications are possible. Computer systems used in connection with implementations of the present disclosure can have other capabilities not specifically described here. Further, while server system 1000 and client computing system 1014 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system such as the data processing system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 110 could be a single module, a logic device having one or more processing modules, one or more servers, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

As used herein, the language "in response to" can include or refer to an action or process that is performed or executed subsequent to, responsive to, directly in response to, upon, following, or based on various actions, events, conditions, or inputs. It should be understood that, while particular data representations (e.g., JSON objects) may be referenced in examples described herein, various types of data representations may be used in various examples.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for modeling live events, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to memory, the one or more processors configured to:

receive an input including at least one machine-readable data object including resources divided by one or more input node identifiers, wherein each of the one or more input node identifiers corresponds with a location of the resources within the at least one machine-readable data object;

generate a multi-level resource mapping encoding associations between the one or more input node identifiers and one or more output node identifiers;

construct, for each of the one or more output node identifiers, a set of model input parameters, each set of model input parameters based on a selection of at least a portion of the resources from the at least one machine-readable data object, the selection based on an association with one or more corresponding input node identifiers encoded by the multi-level resource mapping;

provide each set of model input parameters to a first generative model to generate an output data object for each of the one or more output node identifiers;

generate at least one metric for each output data object, the at least one metric based on a comparison of the output data object to a corresponding structural or coverage parameter;

in response to the at least one metric failing to satisfy the corresponding structural or coverage parameter, automatically generate a modified set of model input parameters to regenerate the output data object; and generate, based on a schema of a word processing application, a function that causes the word processing application to create an annotation for each output data object by (i) identifying, using a second generative model, a textual or graphical representation presented in a first region of a graphical user interface of the word processing application for each output data object and (ii) populating a body of the annotation with an indicator linking each textual or graphical representation to at least one of the one or more input node identifiers, the annotation configured to be presented in a second region of the graphical user interface of the word processing application, wherein the indicator presents the location of the resources on the word processing application via the annotation.

2. The system of claim 1, wherein the one or more processors are further configured to:

associate the annotation with a portion of the output data object presented in the first region of the graphical user interface of the word processing application; and provide the annotation for presentation in the second region of the graphical user interface of the word processing application responsive at least in part to selection of the portion of the output data object.

3. The system of claim 1, wherein the one or more processors are further configured to:

determine a structure and one or more fields of the function based on the schema of the word processing application;

populate, based on the structure, the one or more fields of the function with metadata, the metadata including at least the indicator and a source identifier associated with the second generative model; and execute, via an application programming interface (API) of the word processing application, the function to cause the word processing application to create the annotation attributed to the source identifier.

4. The system of claim 1, wherein the one or more processors are further configured to:

generate a target object by aggregating the textual or graphical representation for each output data object based on the multi-level resource mapping and at least one set of (i) accuracy parameters, (ii) content and completeness parameters, (iii) style parameters, or (iv) refinements; and cause the word processing application to present the target object on a client device.

5. The system of claim 1, wherein at least one set of model input parameters includes:

the selection of resources associated with a corresponding output node identifier;

one or more target-specific parameters; and instructions to cause the first generative model to generate the output data object based on the selection of resources and the one or more target-specific parameters.

6. The system of claim 1, wherein the one or more processors are further configured to:

provide the modified set of model input parameters to the first generative model;

receive a regenerated output data object; and update the at least one metric based on a comparison of the regenerated output data object to the corresponding structural or coverage parameter.

7. The system of claim 1, wherein the one or more processors are further configured to:

cause a client device to present at least one input element configured to receive the input including the at least one machine-readable data object; and tag the at least one machine-readable data object with the one or more input node identifiers.

8. The system of claim 1, wherein the one or more processors are further configured to:

cause the word processing application to present, within each annotation associated with a graphical representation, at least one graphical type for generation of a graphical object associated with the graphical representation.

9. The system of claim 1, wherein the one or more processors are further configured to:

cause a client device to present at least one input element associated with the multi-level resource mapping; and receive, via the at least one input element, at least one of a confirmation or adjustment to the associations between the one or more input node identifiers and the one or more output node identifiers encoded by the multi-level resource mapping.

10. The system of claim 9, wherein at least one of (i) the presentation of the input element or (ii) the confirmation or adjustment to the associations between the one or more input node identifiers and the one or more output node identifiers is based on one or more regulatory-specific or industry-specific parameters.

11. The system of claim 1, wherein at least one annotation includes a flag indicating that resources corresponding to an input node identifier are missing from the at least one machine-readable data object.

12. The system of claim 1, wherein the one or more processors are further configured to:

provide an audit log including a plurality of immutable timestamps generated based on a plurality of operations associated with generation of each output data object.

13. The system of claim 1, wherein the one or more processors are further configured to:

provide, within the annotation generated for each output data object, a rationale supporting association of a corresponding input node identifier with the output data object.

14. The system of claim 1, wherein the one or more processors are further configured to:

automatically generate and validate one or more citations associated with at least one of (i) the annotation for each output data object, (ii) each output data object, or (iii) a reference list for a target object including each output data object.

15. The system of claim 1, wherein the one or more processors are further configured to:

generate, based on each output data object included in a target object, a visual representation the resources associated with the one or more input node identifiers at a plurality of processing stages.

16. A method, comprising:

receiving, by one or more processors coupled to memory, an input including at least one machine-readable data object including resources divided by one or more input node identifiers, wherein each of the one or more input node identifiers corresponds with a location of the resources within the at least one machine-readable data object;

generating, by the one or more processors, a multi-level resource mapping encoding associations between the one or more input node identifiers and one or more output node identifiers;

constructing, by the one or more processors, a set of model input parameters for each of the one or more output node identifiers, each set of model input parameters based on a selection of the resources from the at least one machine-readable data object, the selection based on an association with one or more corresponding input node identifiers encoded by the multi-level resource mapping;

providing, by the one or more processors, each set of model input parameters to a first generative model to generate an output data object for each of the one or more output node identifiers;

generating, by the one or more processors, at least one metric for each output data object, the at least one metric based on a comparison of the output data object to a corresponding structural or coverage parameter;

in response to the at least one metric failing to satisfy the corresponding structural or coverage parameter, automatically generating, by the one or more processors, a modified set of model input parameters to regenerate the output data object; and generating, by the one or more processors, based on a schema of a word processing application, a function that causes the word processing application to create an annotation for each output data object by (i) identifying, using a second generative model, a textual or graphical representation presented in a first region of a graphical user interface of the word processing application for each output data object and (ii) populating a body of the annotation with an indicator linking each textual or graphical representation to at least one of the one or more input node identifiers, the annotation configured to be presented in a second region of the graphical user interface of the word processing application, wherein the indicator presents the location of the resources on the word processing application via the annotation.

17. The method of claim 16, further comprising:

associating, by the one or more processors, the annotation with a portion of the output data object presented in the first region of the graphical user interface of the word processing application; and providing, by the one or more processors, the annotation for presentation in the second region of the graphical user interface of the word processing application responsive at least in part to selection of the portion of the output data object.

18. A non-transitory computer-readable storage medium having one or more instructions stored thereon, the one or more instructions executable by one or more processors to:

receive an input including at least one machine-readable data object including resources divided by one or more input node identifiers, wherein each of the one or more input node identifiers corresponds with a location of the resources within the at least one machine-readable data object;

generate a multi-level resource mapping encoding associations between the one or more input node identifiers and one or more output node identifiers;

construct, for each of the one or more output node identifiers, a set of model input parameters, each set of model input parameters based on a selection of at least a portion of the resources from the at least one machine-readable data object, the selection based on an association with one or more corresponding input node identifiers encoded by the multi-level resource mapping;

provide each set of model input parameters to a first generative model to generate an output data object for each of the one or more output node identifiers;

generate at least one metric for each output data object, the at least one metric based on a comparison of the output data object to a corresponding structural or coverage parameter;

in response to the at least one metric failing to satisfy the corresponding structural or coverage parameter, automatically generate a modified set of model input parameters to regenerate the output data object; and generate, based on a schema of a word processing application, a function that causes the word processing application to create an annotation for each output data object by (i) identifying, using a second generative model, a textual or graphical representation presented in a first region of a graphical user interface of the word processing application for each output data object and (ii) populating a body of the annotation with an indicator linking each textual or graphical representation to at least one of the one or more input node identifiers, the annotation configured to be presented in a second region of the graphical user interface of the word processing application, wherein the indicator presents the location of the resources on the word processing application via the annotation.

\* \* \* \* \*